(12) United States Patent
Conkle et al.

(10) Patent No.: US 12,497,195 B2
(45) Date of Patent: Dec. 16, 2025

(54) ARTICULATING SPACECRAFT CHASSIS

(71) Applicant: Government of the United States, as represented by the Secretary of the Air Force, Wright-Patterson AFB, OH (US)

(72) Inventors: Christian T. Conkle, Pensacola, FL (US); Robert A. Bettinger, Oakwood, OH (US); Philip D. Smith, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/531,906

(22) Filed: Dec. 7, 2023

(65) Prior Publication Data

US 2025/0121958 A1     Apr. 17, 2025

Related U.S. Application Data

(60) Provisional application No. 63/543,814, filed on Oct. 12, 2023.

(51) Int. Cl.
| | |
|---|---|
| *B64G 1/22* | (2006.01) |
| *B64G 1/10* | (2006.01) |
| *B64G 4/00* | (2006.01) |

(52) U.S. Cl.
CPC ............ *B64G 1/2222* (2023.08); *B64G 1/10* (2013.01); *B64G 1/2229* (2023.08); *B64G 4/00* (2013.01); *B64G 2004/005* (2013.01)

(58) Field of Classification Search
CPC ...... B64G 1/2222; B64G 1/10; B64G 1/2229; B64G 4/00; B64G 2004/005
See application file for complete search history.

(56) References Cited

U.S. PATENT DOCUMENTS

| | | | |
|---|---|---|---|
| 6,016,999 A * | 1/2000 | Simpson .............. | B64G 1/1007 244/173.1 |
| 6,568,638 B1 * | 5/2003 | Capots ................. | B64G 1/2224 244/159.4 |

(Continued)

OTHER PUBLICATIONS

Qiliang, S.; Dong, Y.; Zhaowei, S.; Bo, W.; "Motion Planning Techniques for Self-Configuration of Homogeneous Pivoting Cube Modular Satellite," Aerospace Science and Technology, 2022, 120.

(Continued)

*Primary Examiner* — Joshua D Huson
*Assistant Examiner* — Vicente Rodriguez
(74) *Attorney, Agent, or Firm* — AFMCLO/JAZ; Jeffrey V. Bamber

(57) ABSTRACT

The present invention relates to articulating spacecraft chassis and methods of making and using same. The present invention relates to spacecraft chassis and methods of making and using same. Such spacecraft chassis have a dynamic movement capability that allows the spacecraft to alter its structure while still maintaining industry volumetric launch standards. This capability increases opens up a wide range of achievable volumetric states and increases the ability to meet mission requirements by introducing a new tunable parameter. In addition, the judicious selection of certain dynamic movement parameters can result increased payload capabilities and improved maneuverability.

2 Claims, 24 Drawing Sheets

(56) References Cited

U.S. PATENT DOCUMENTS

| | | | | |
|---|---|---|---|---|
| 7,156,349 | B2* | 1/2007 | Nakasuka | B64G 1/10 |
| | | | | 244/172.7 |
| 10,368,251 | B1* | 7/2019 | Olds | B64G 1/2224 |
| 10,773,831 | B2* | 9/2020 | Wang | B64G 1/244 |
| 11,155,366 | B2* | 10/2021 | Helvajian | B64G 1/646 |
| 2019/0088990 | A1* | 3/2019 | Sastry | H01M 10/0431 |

OTHER PUBLICATIONS

Conkle, C. T.; Bettinger, R. A.; Smith, P. D.; Articulating CubeSat Platform for in Orbit Volume Reconfiguration Aug. 9, 2023, Poster.
Conkle, C. T.; Bettinger, R. A.; Smith, P. D.; Articulating CubeSat Platform for in Orbit Volume Reconfiguration Aug. 9, 2023, Abstract.
News Release: SATLANTIS Signs a Strategic Alliance with SuperSharp in UK, May 17, 2023.
Puig-Suari, Jordi and Twiggs, Bob, "CubeSat Design Specification Rev. 13", The CubeSat Program, Cal Poly SLO, Feb. 20, 2014.

* cited by examiner

ARTICULATING SPACECRAFT CHASSIS

CROSS-REFERENCE TO RELATED APPLICATIONS

The present application claims priority to U.S. Provisional Application Ser. No. 63/543,814 filed Oct. 12, 2023, the contents of such provisional application hereby being incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to articulating spacecraft chassis and methods of making and using same.

BACKGROUND OF THE INVENTION

Current spacecraft chassis are limited to a single configuration and volume by launch vehicle requirements and spacecraft orbital speeds. With respect to spacecraft orbital speeds, such speeds can exceed 18,000 miles per hour. Thus, altering a current spacecraft's structural configuration while in orbit is currently not feasible through internal and/or external manipulation of said spacecraft.

Applicants recognized that the source of the aforementioned problem was that current spacecraft chassis do not allow for spacecraft chassis dynamic movement to the spacecraft's structure while still maintaining industry volumetric launch standards. Applicants recognized that the use of certain types of structural features, for example, certain hinging could permit a spacecraft chassis to undergo an in-space dynamic reorientation. This capability increases opens up a wide range of achievable volumetric states and increases the ability to meet mission requirements by introducing a new tunable parameter. In addition, the judicious selection of certain dynamic movement parameters can result in increased payload capabilities and improved maneuverability. Such increased payload capabilities includes, for example, increased focal length capabilities and such improved maneuverability results in, for example, increased gravity gradient stabilities, variable rotational stabilities, modified moments of inertia, adjustable solar radiation pressure drag and adjustable atmospheric drag.

SUMMARY OF THE INVENTION

The present invention relates to spacecraft chassis and methods of making and using same. Such spacecraft chassis have a dynamic movement capability that allows the spacecraft to alter its structure while still maintaining industry volumetric launch standards. This capability increases opens up a wide range of achievable volumetric states and increases the ability to meet mission requirements by introducing a new tunable parameter. In addition, the judicious selection of certain dynamic movement parameters can result in increased payload capabilities and improved maneuverability.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose As used herein, the words "and/or" means, when referring to embodiments (for example an embodiment having elements A and/or B) that the embodiment may have element A alone, element B alone, or elements A and B taken together.

As used herein, the term "articulation" when used as an adjective, means the ability to rotate or translate, in orbit, one or more segments and/or units of a spacecraft chassis, each segment having a volume.

As used herein, the term "organic geometry" means a geometry found in nature, such as a femur, that is not characterized as a traditional geometric shape.

As used herein, the term "symmetrical geometry" means being the same on all sides such that a central dividing plane (a mirror plane) can be drawn on it, to show that all sides of the shape are exactly the same.

As used herein, the term "asymmetrical geometry" means its halves are not mirror images of each other. Thus, if a line (which is called the plane of symmetry or axis of symmetry) is drawn down the middle of an asymmetrical object and it is folded in half, the two sides will not match.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Detailed Description of the Drawings

Figure 1:
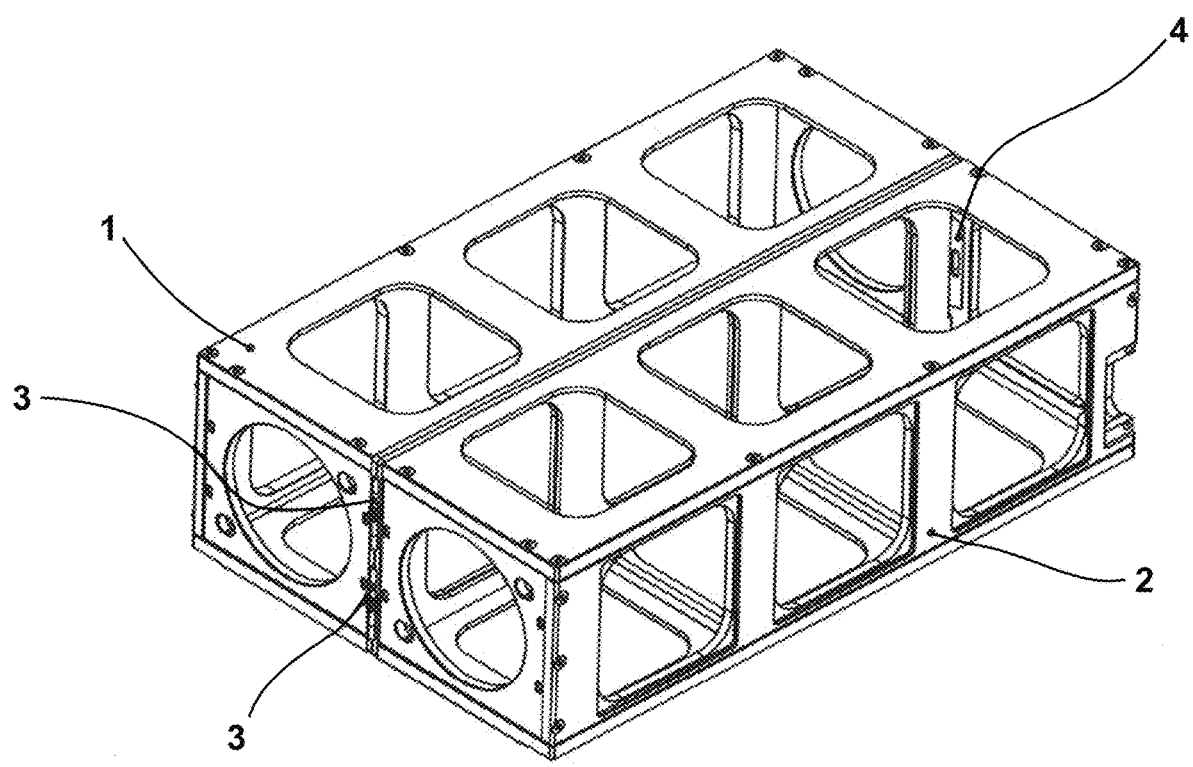
FIG. 1 depicts an articulating spacecraft chassis in stowed position for launch into space.

FIG. 1 depicts an articulating spacecraft chassis in stowed position for launch into space having articulating chassis unit right (1), articulating chassis unit left (2), chassis hinge assemblies (3) and articulation locking unit (4). Each chassis hinge assembly may contain hinge plates, a spring bushing, and an engineered spring, and the articulation locking unit locks both chassis structures together until release is desired.

Figure 2:
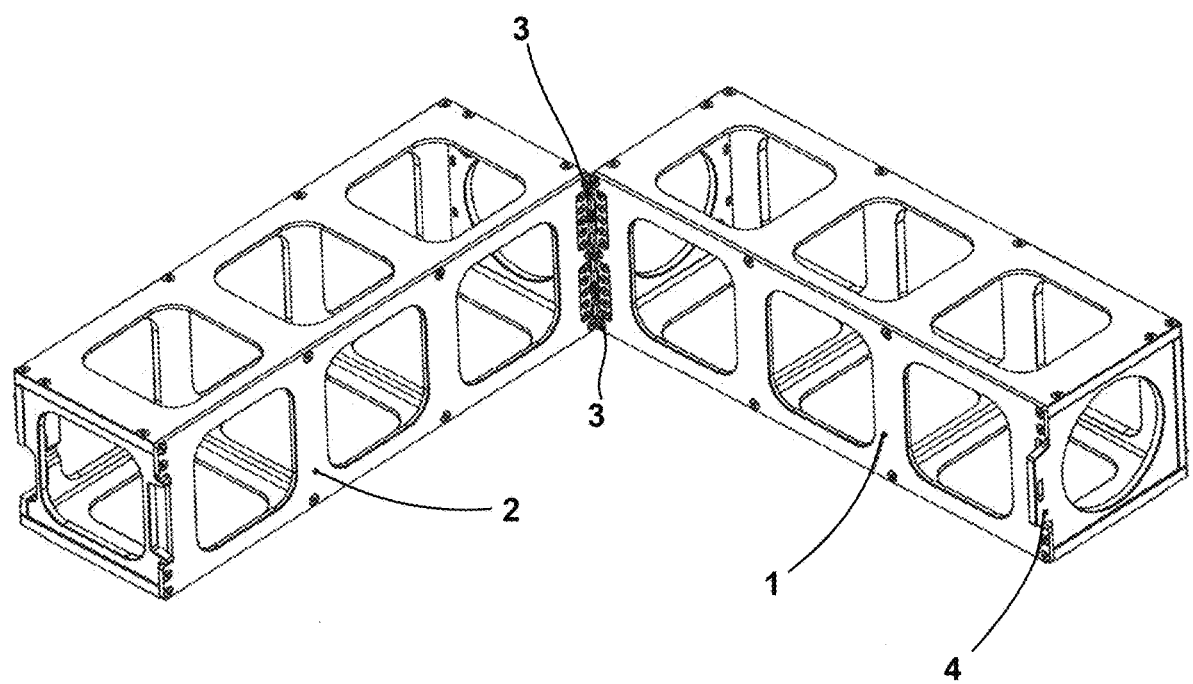
FIG. 2 depicts an articulating spacecraft chassis in transient position just after release mechanism actuated and the springs have started the structures to rotate about the hinge pins.

FIG. 2 depicts an articulating spacecraft chassis having articulating chassis unit right (1), articulating chassis unit left (2), chassis hinge assemblies (3) and articulation locking unit (4), said articulating spacecraft chassis being in transient position just after release.

Figure 3:
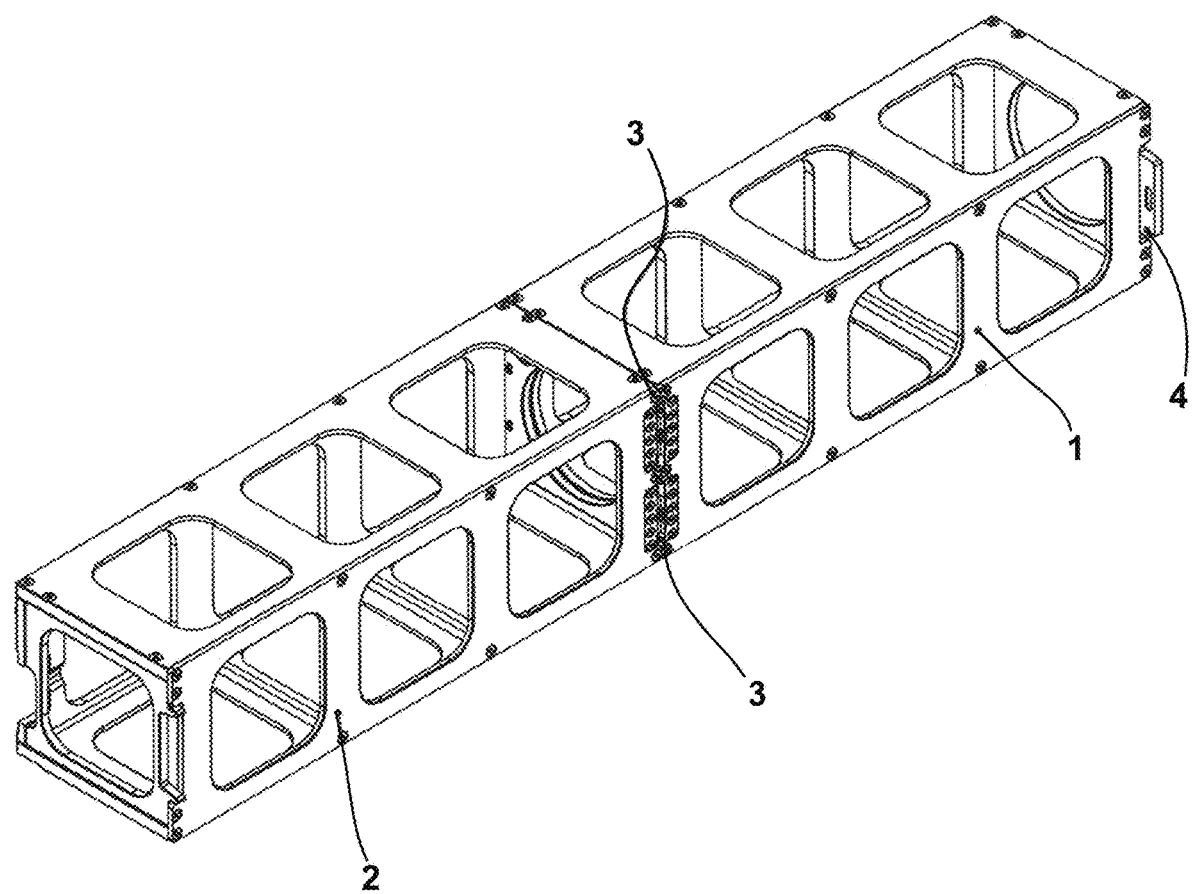
FIG. 3 depicts an articulating spacecraft chassis depicted in deployed position as chassis structures come to full rest against end faces.

FIG. 3 depicts an articulating spacecraft chassis having articulating chassis unit right (1), articulating chassis unit left (2), chassis hinge assemblies (3) and articulation locking unit (4), said articulating spacecraft chassis being depicted in deployed position as chassis structures come to full rest against end faces.

Figure 4:
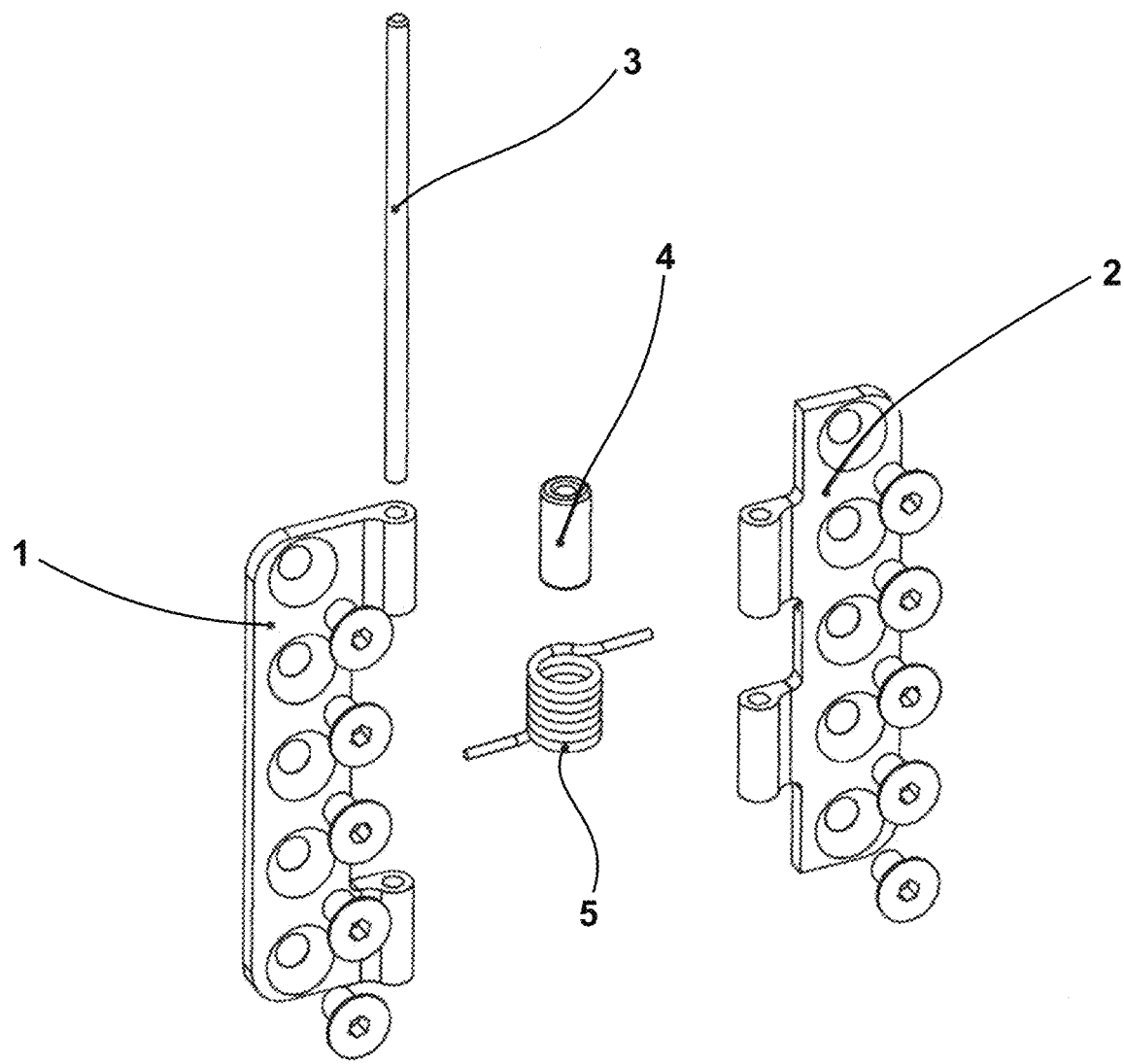
FIG. 4 depicts a deployment hinge, which is designed for space environment to prevent binding while controlling axial movements, thus increasing alignment accuracy when the structures are fully deployed.

FIG. 4 depicts a deployment hinge having female hinge (1), male hinge (2), floating hinge pin (3), hinge bushing (4) and engineered spring (5). Said deployment hinge is designed for space environment to prevent binding while controlling axial movements, thus increasing alignment accuracy when the structures are fully deployed.

Figure 5:
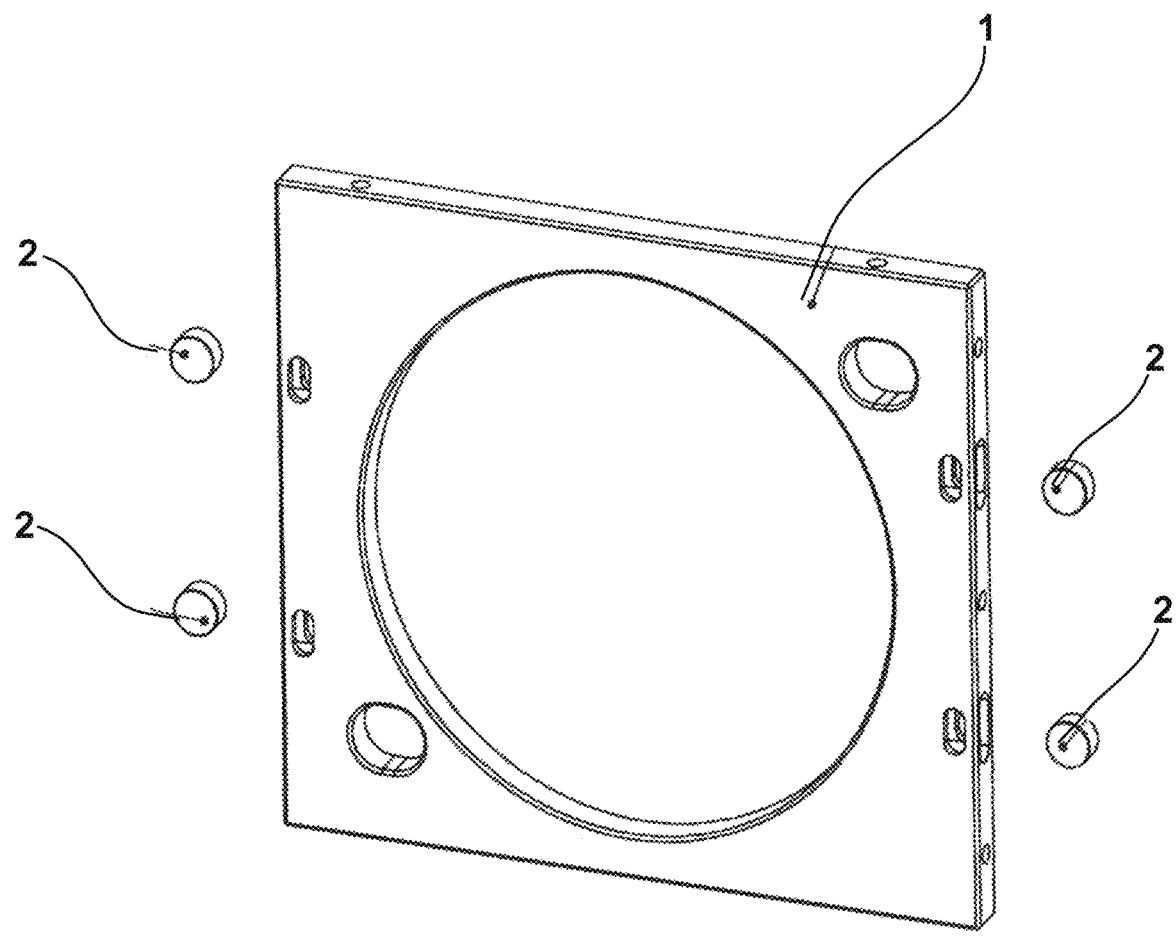
FIG. 5 depicts an endplate of chassis structure that contains neodymium magnets which serve to hold the deployed chassis in position after the release mechanism has initiated the deployment process.

FIG. 5 depicts an endplate of chassis structure that contains chassis unit endplate (1) and neodymium magnets (2) which serve to hold the deployed chassis in position after the release mechanism has initiated the deployment process.

Figure 6:
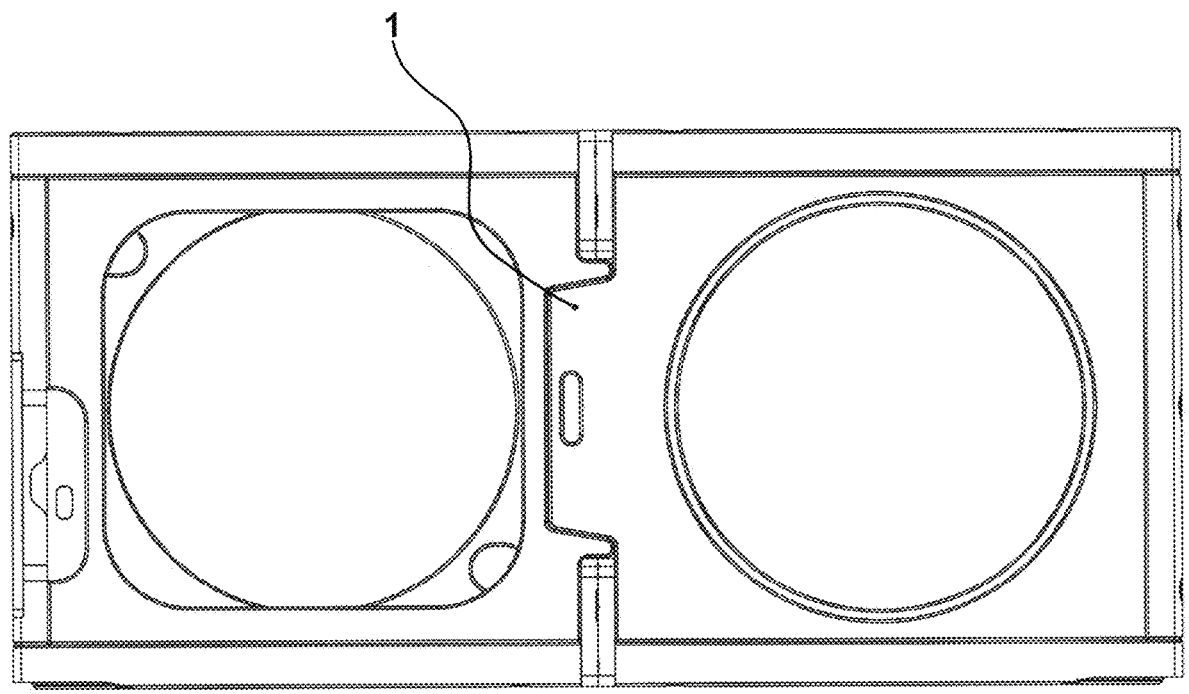
FIG. 6 depicts an end of the chassis showing tapered locking feature for structural control of chassis during the launch phase of the satellite.

FIG. 6 depicts an end of chassis showing tapered locking feature (1) which allows for positive control for all three coordinate degrees-of-freedom for structural control of chassis during the launch phase of the satellite.

Figure 7:
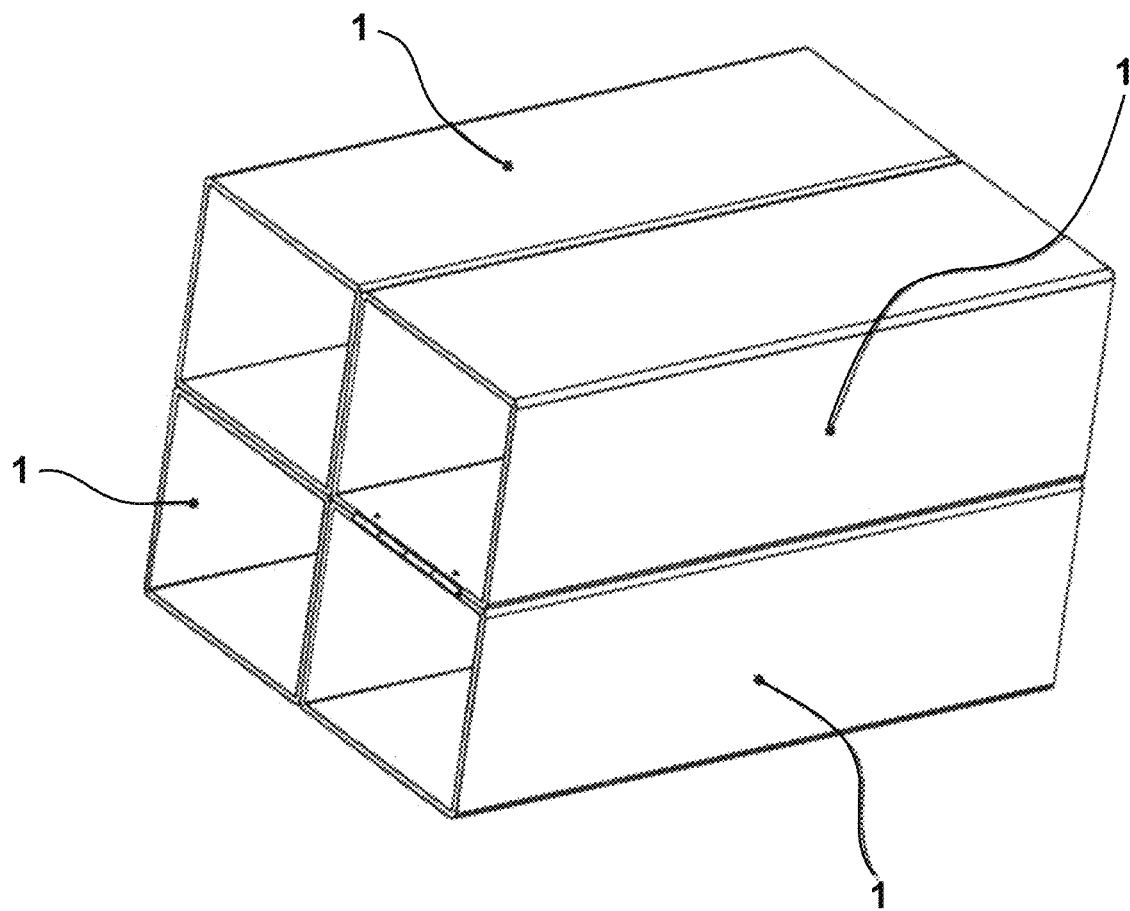
FIG. 7 depicts an implementation of a folding articulation in a quadruple unit structure, shown stowed.

FIG. 7 depicts an implementation of a folding articulation in a quadruple unit structure, having structural units (1), said folding articulation in a quadruple unit structure being shown stowed.

Figure 8:
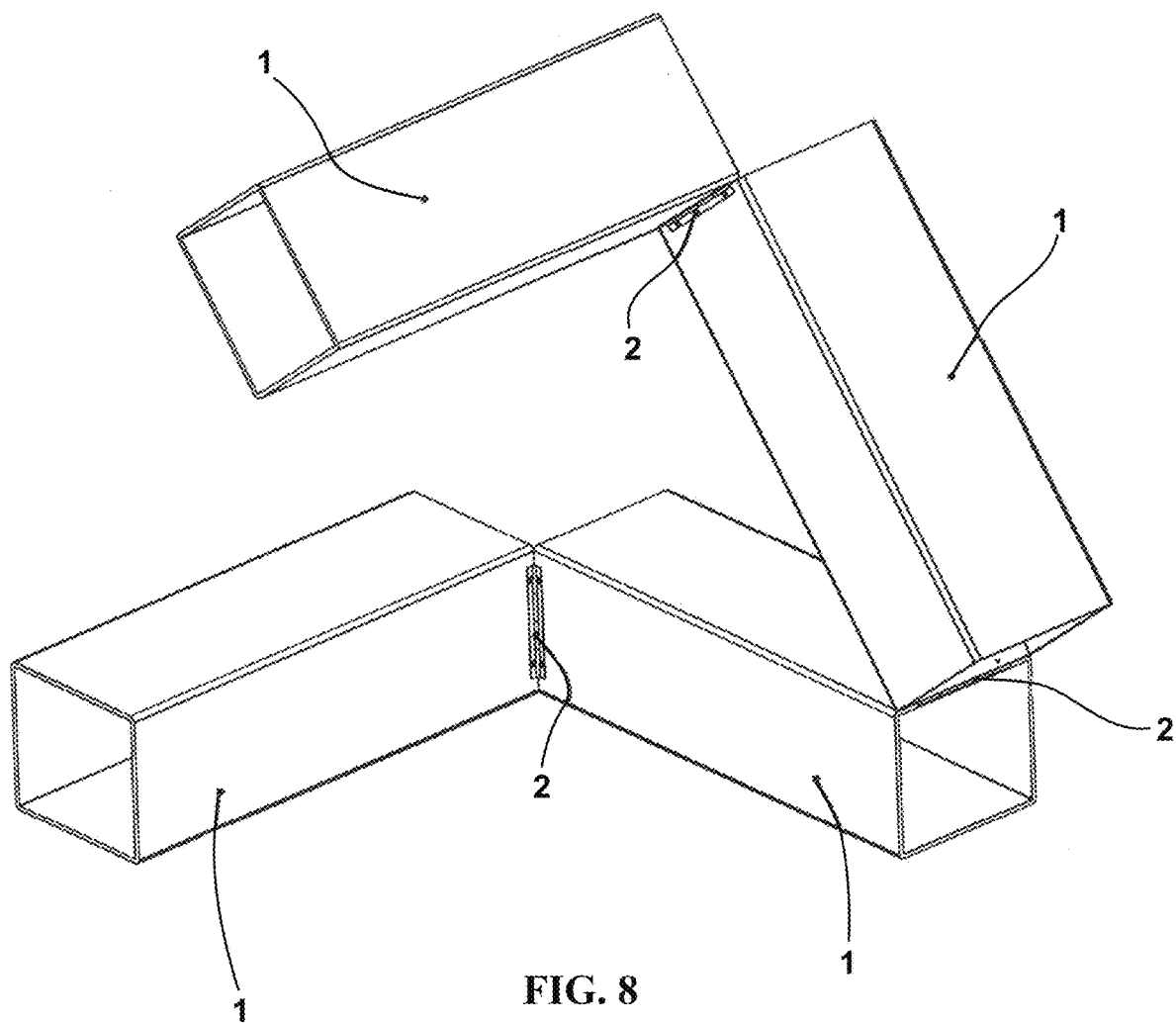
FIG. 8 depicts an implementation of a folding articulating satellite in a quadruple unit structure, shown in transit approaching a deployed state.

FIG. 8 depicts an implementation of a folding articulating satellite in a quadruple unit structure, having structural units (1) and connective hinges (2), said folding articulation in a quadruple unit structure being shown in transit approaching a deployed state.

Figure 9:
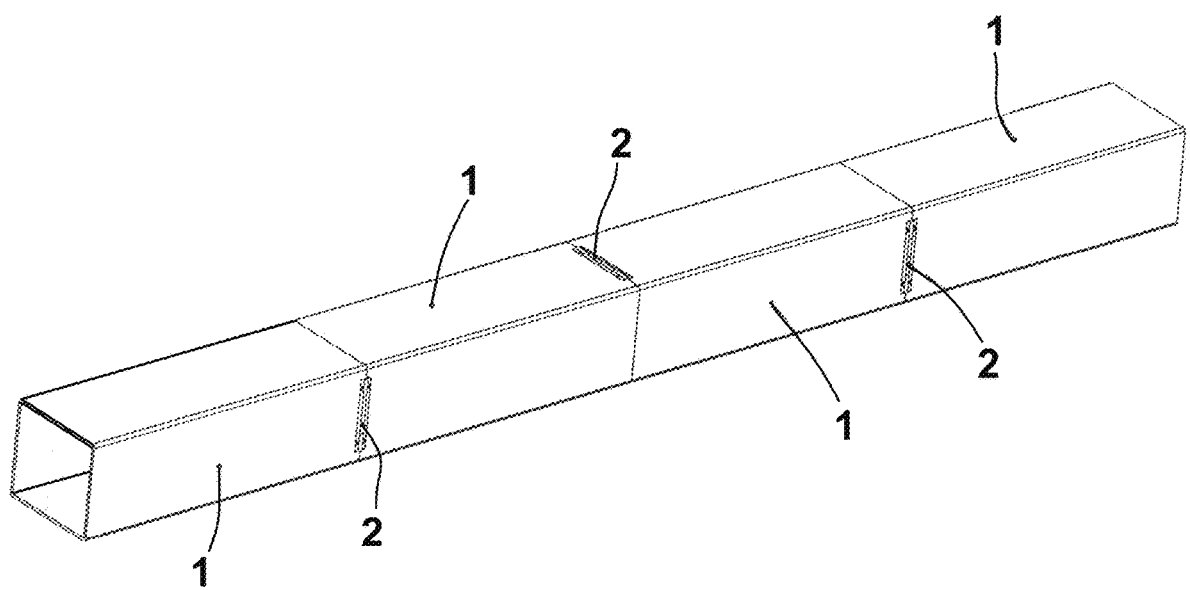
FIG. 9 depicts an implementation of a folding articulation in a quadruple unit structure, shown in a fully deployed state.

FIG. 9 depicts an implementation of a folding articulation in a quadruple unit structure, having structural units (1) and connective hinges (2), said folding articulation in a quadruple unit structure being shown in a fully deployed state.

Figure 10:
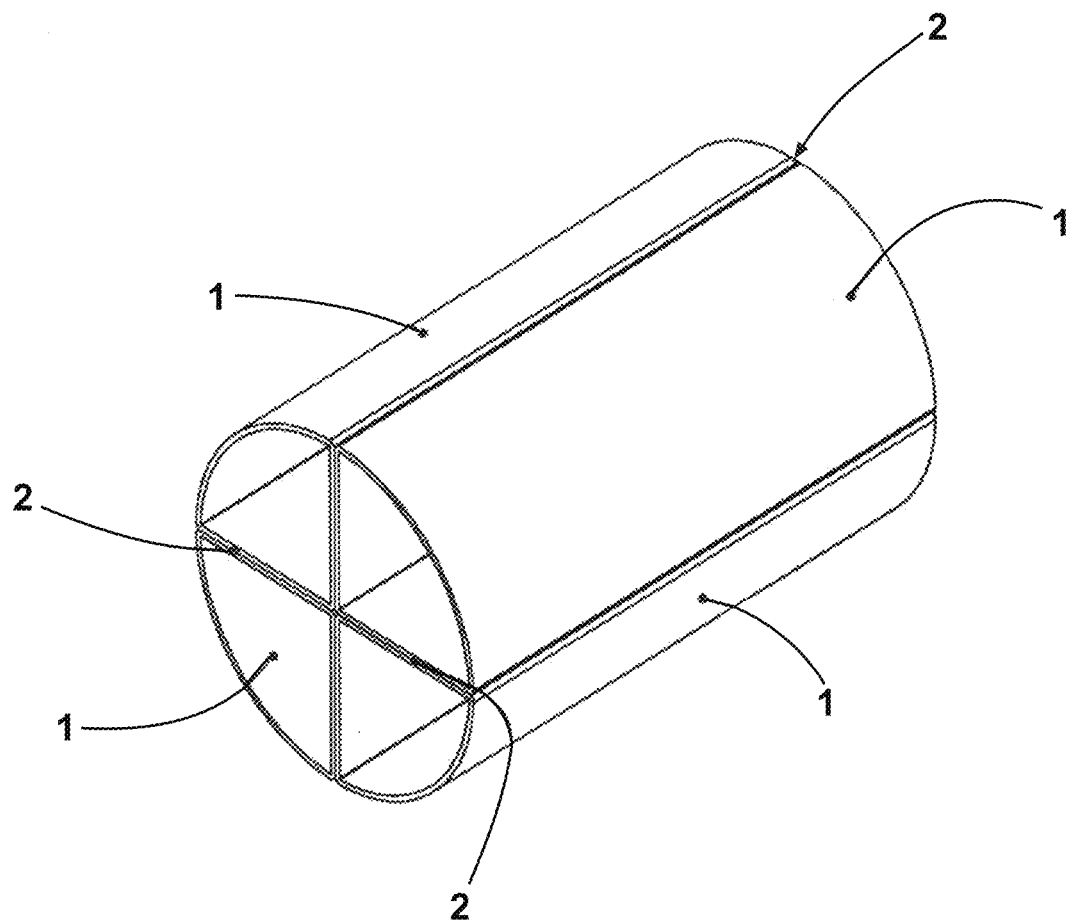
FIG. 10 depicts an implementation of a folding articulation in a quadruple cylindrical unit structure, shown in a fully stowed state.

FIG. 10 depicts an implementation of a folding articulation in a quadruple cylindrical unit structure, having semi-cylindrical structural units (1) and hinge locations (2), said folding articulation in a quadruple cylindrical unit structure being shown in a fully stowed state.

Figure 11:
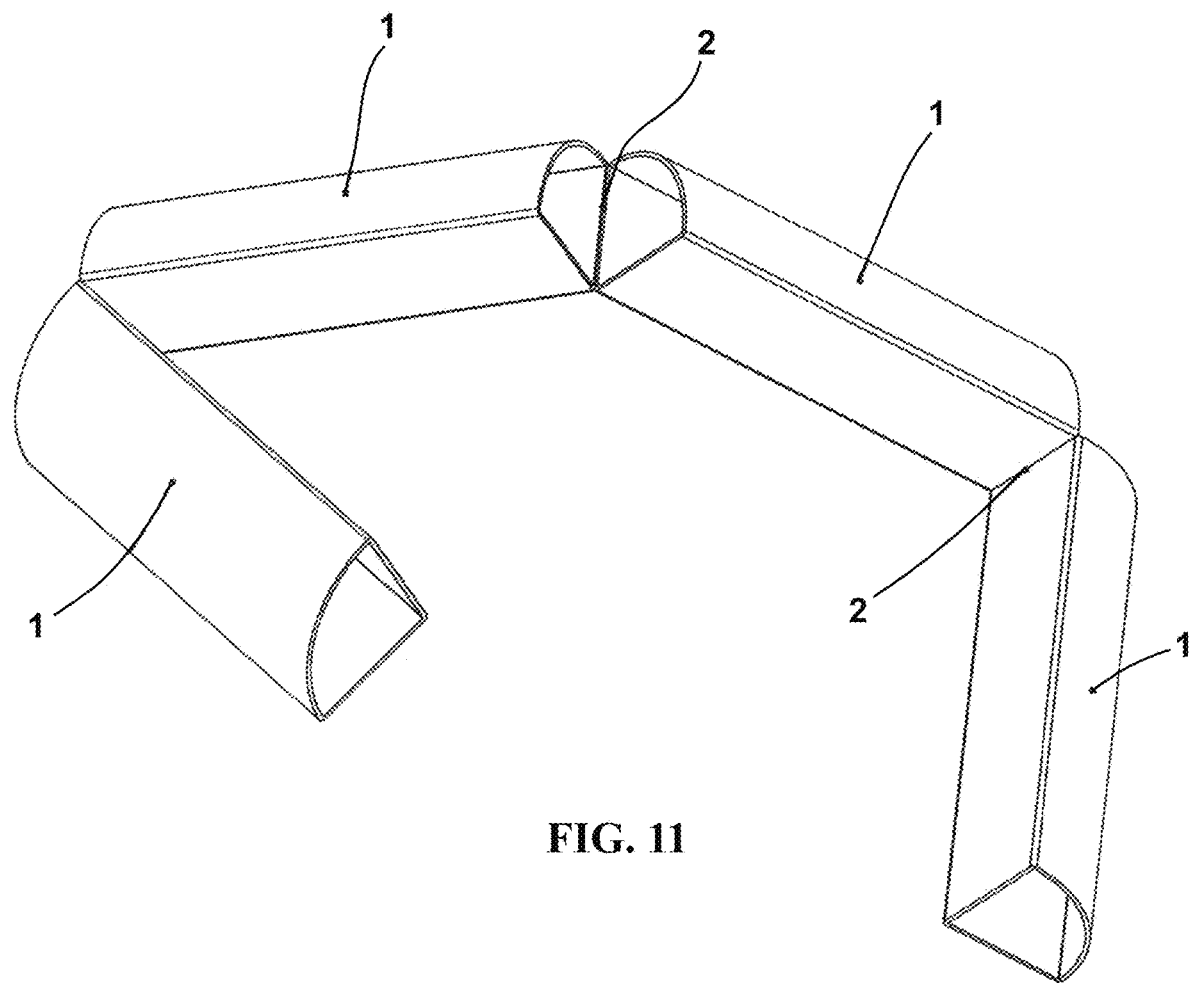
FIG. 11 depicts an implementation of a folding articulation in a quadruple cylindrical unit structure, shown in transit approaching a deployed state.

FIG. 11 depicts an implementation of a folding articulation in a quadruple cylindrical unit structure, having semi-cylindrical structural units (1) and hinge locations (2), said folding articulation in a quadruple cylindrical unit structure being shown in transit approaching a deployed state.

Figure 12:
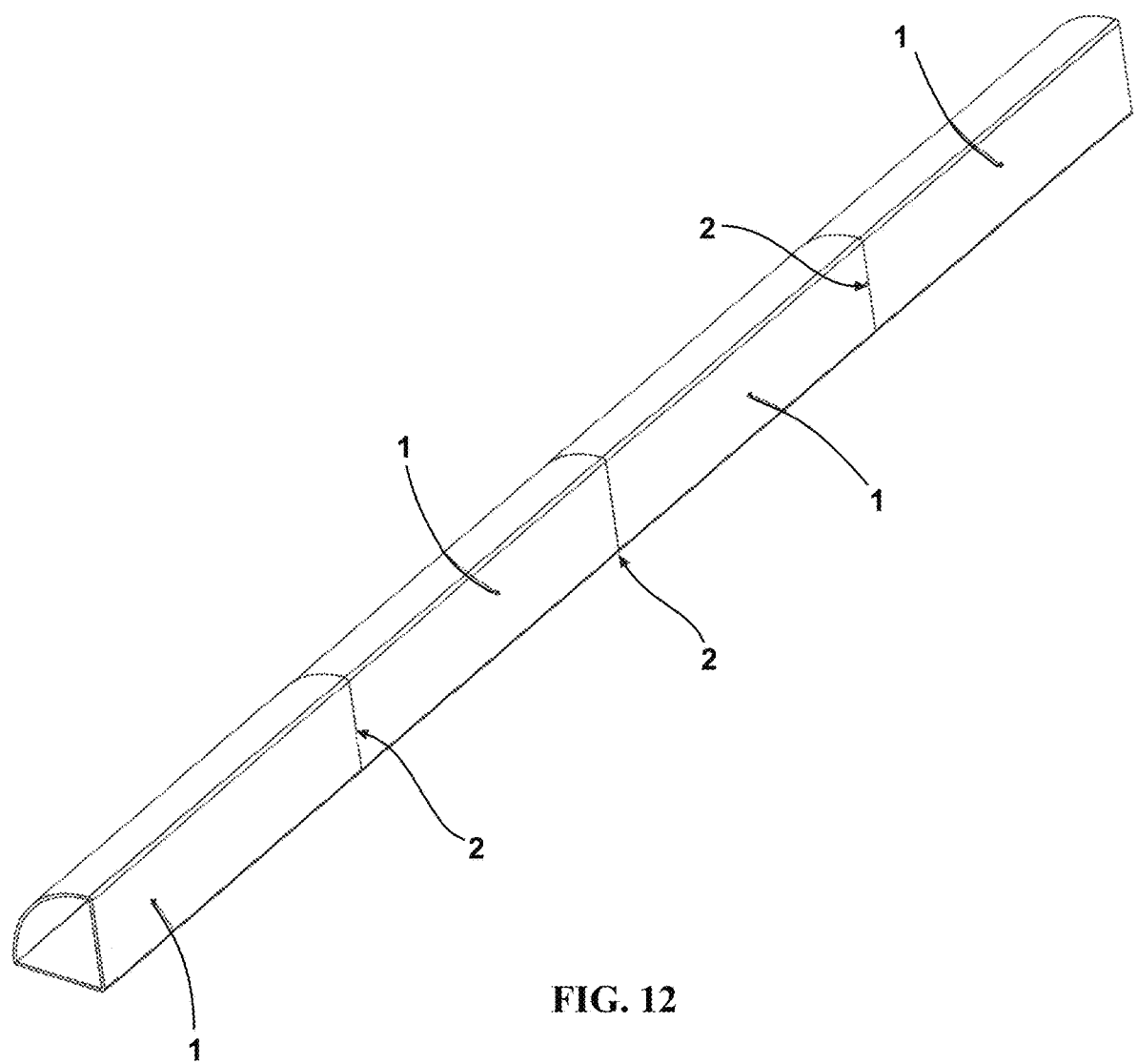
FIG. 12 depicts an implementation of a folding articulation in a quadruple cylindrical unit structure, shown in a fully deployed state.

FIG. 12 depicts an implementation of a folding articulation in a quadruple cylindrical unit structure, having semi-cylindrical structural units (1) and hinge locations (2), said folding articulation in a quadruple cylindrical unit structure being shown in a fully deployed state.

Figure 13:
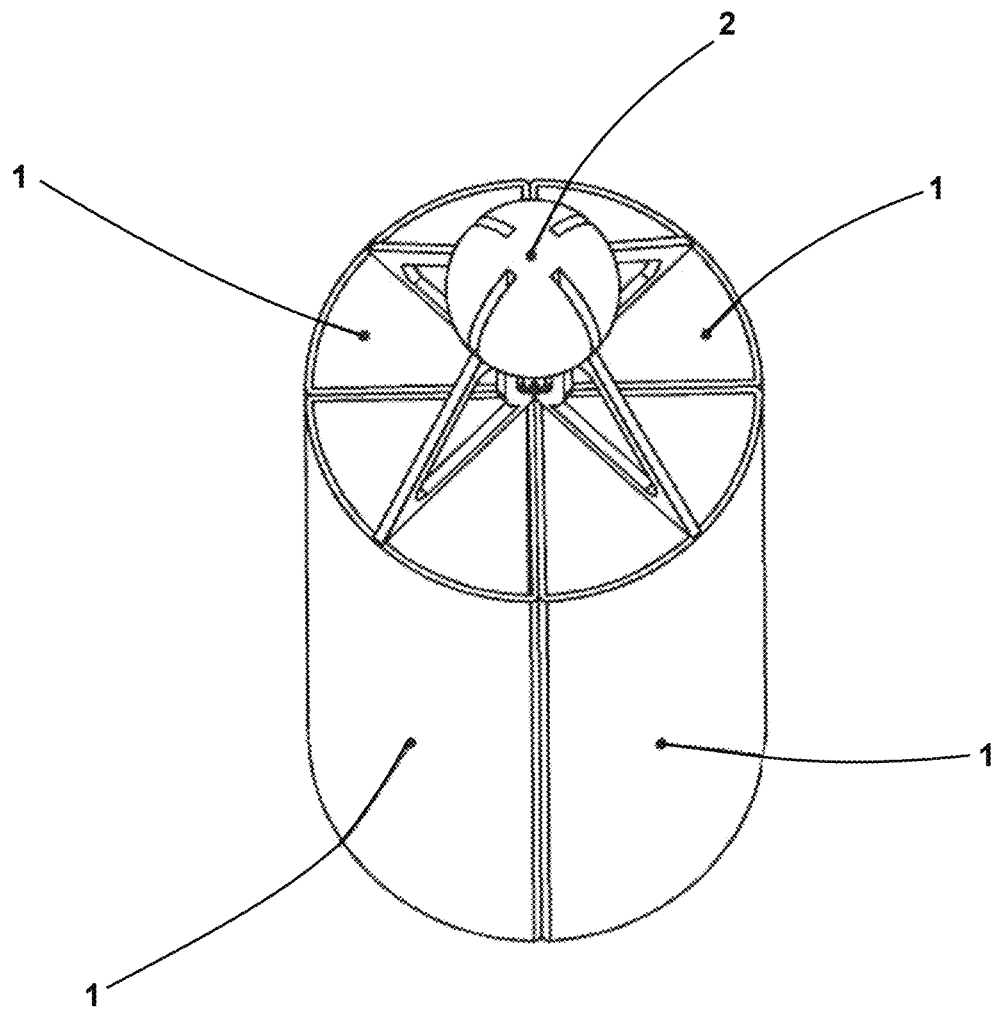
FIG. 13 depicts an implementation of a flowering articulation in a quadruple cylindrical unit structure, shown in a fully stowed state.

FIG. 13 depicts an implementation of a flowering articulation in a quadruple cylindrical unit structure, having semi-cylindrical units (1) and rotational deployment unit (2), said flowering articulation in a quadruple cylindrical unit structure being shown in a fully stowed state. This design allows for infinite angles of relative deployments in relation to each individual structural unit and chassis re-configuration to take place during satellite's mission life.

Figure 14:
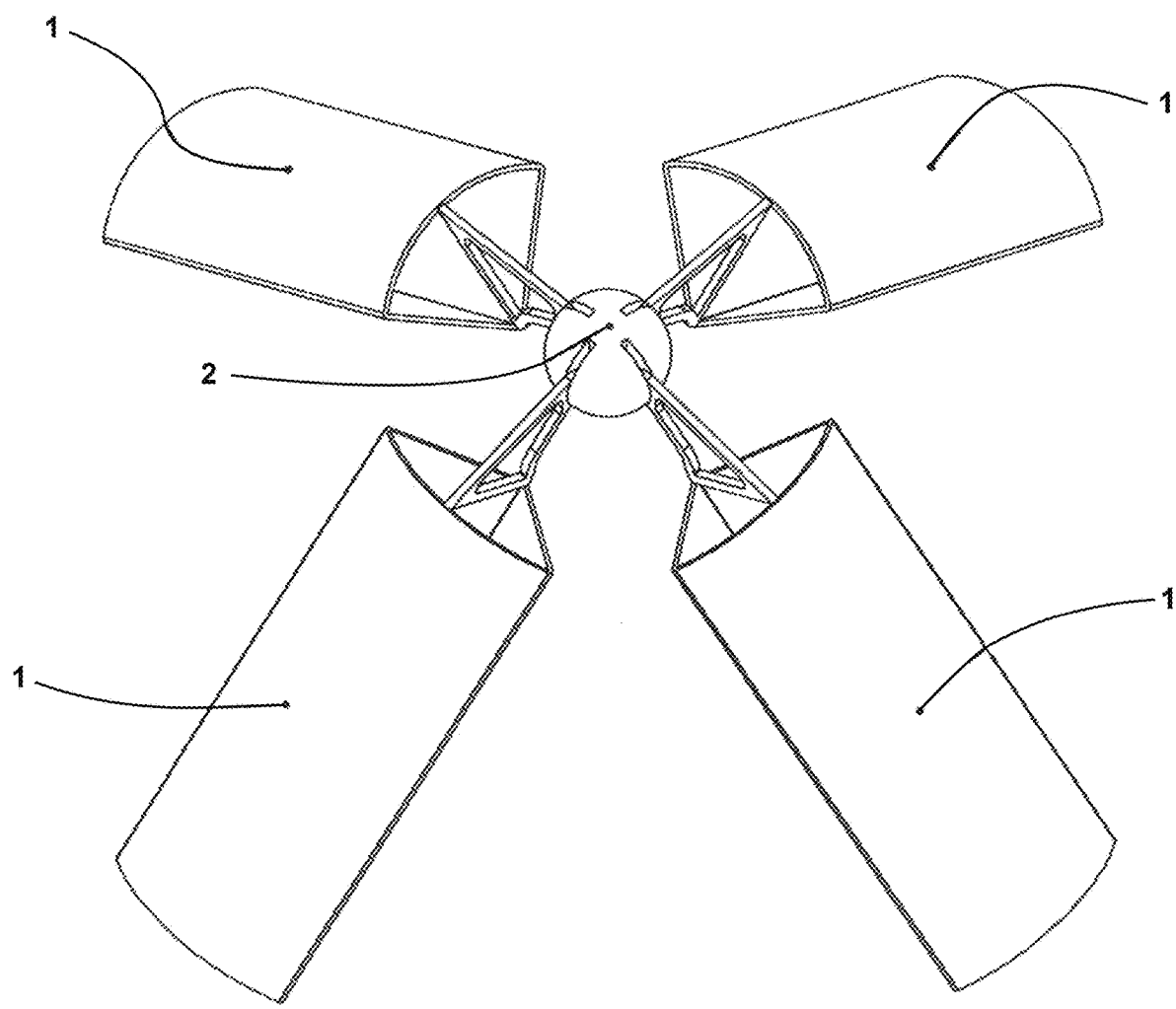
FIG. 14 depicts an implementation of flowering articulation in a quadruple cylindrical unit structure, shown in transit approaching a deployed state.

FIG. 14 depicts an implementation of flowering articulation in a quadruple cylindrical unit structure, having semi-cylindrical units (1) and rotational deployment unit (2), said flowering articulation in a quadruple cylindrical unit structure being shown in transit approaching a deployed state. This design allows for infinite angles of relative deployments in relation to each individual structural unit and chassis re-configuration to take place during satellite's mission life.

Figure 15:
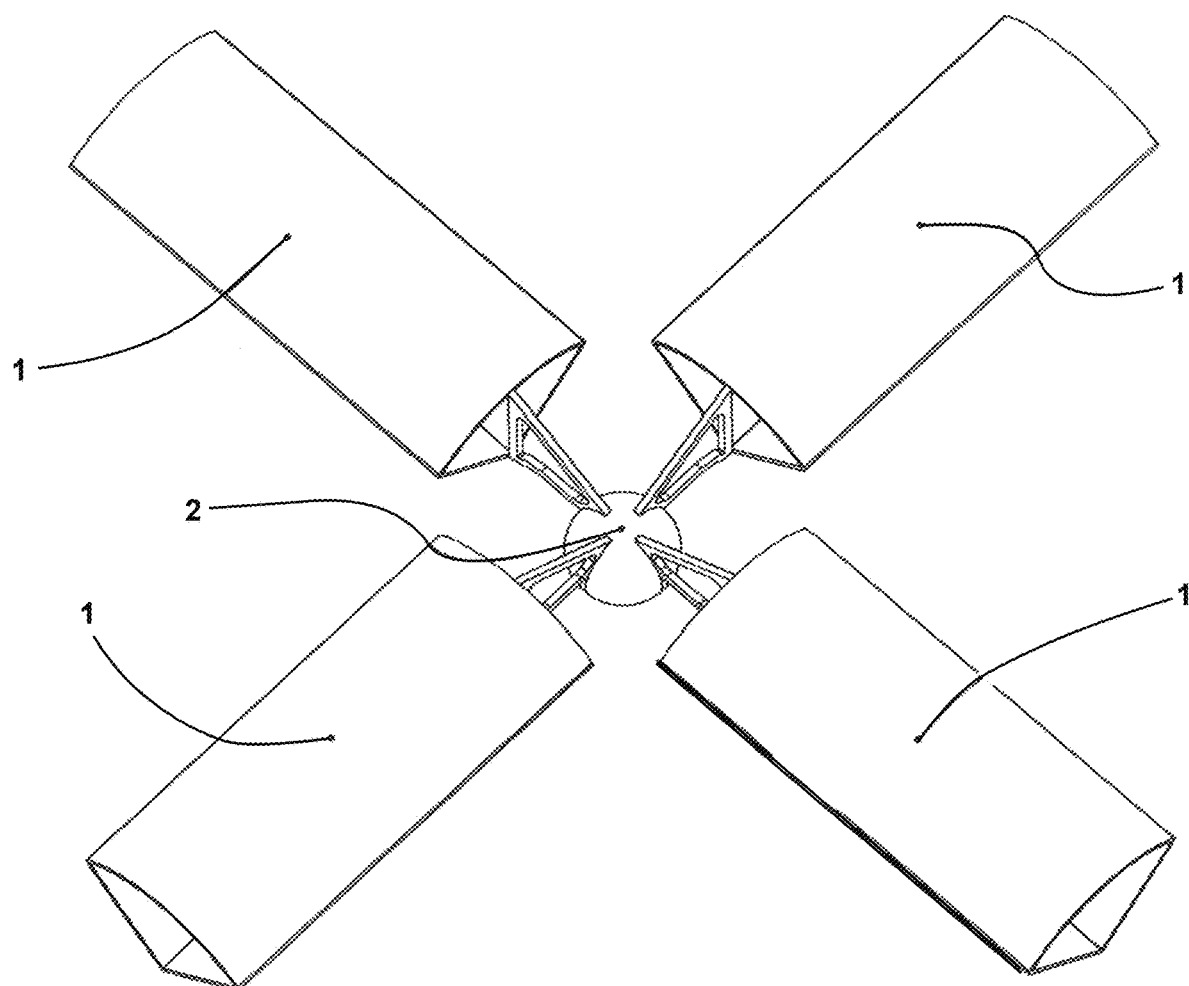
FIG. 15 depicts an implementation of a flowering articulation in a quadruple cylindrical unit structure, shown in a typical deployed state.

FIG. 15 depicts an implementation of a flowering articulation in a quadruple cylindrical unit structure, having semi-cylindrical units (1) and rotational deployment unit (2), said flowering articulation in a quadruple cylindrical unit structure being shown in a typical deployed state. This design allows for infinite angles of relative deployments in relation to each individual structural unit and chassis re-configuration to take place during satellite's mission life.

Figure 16:
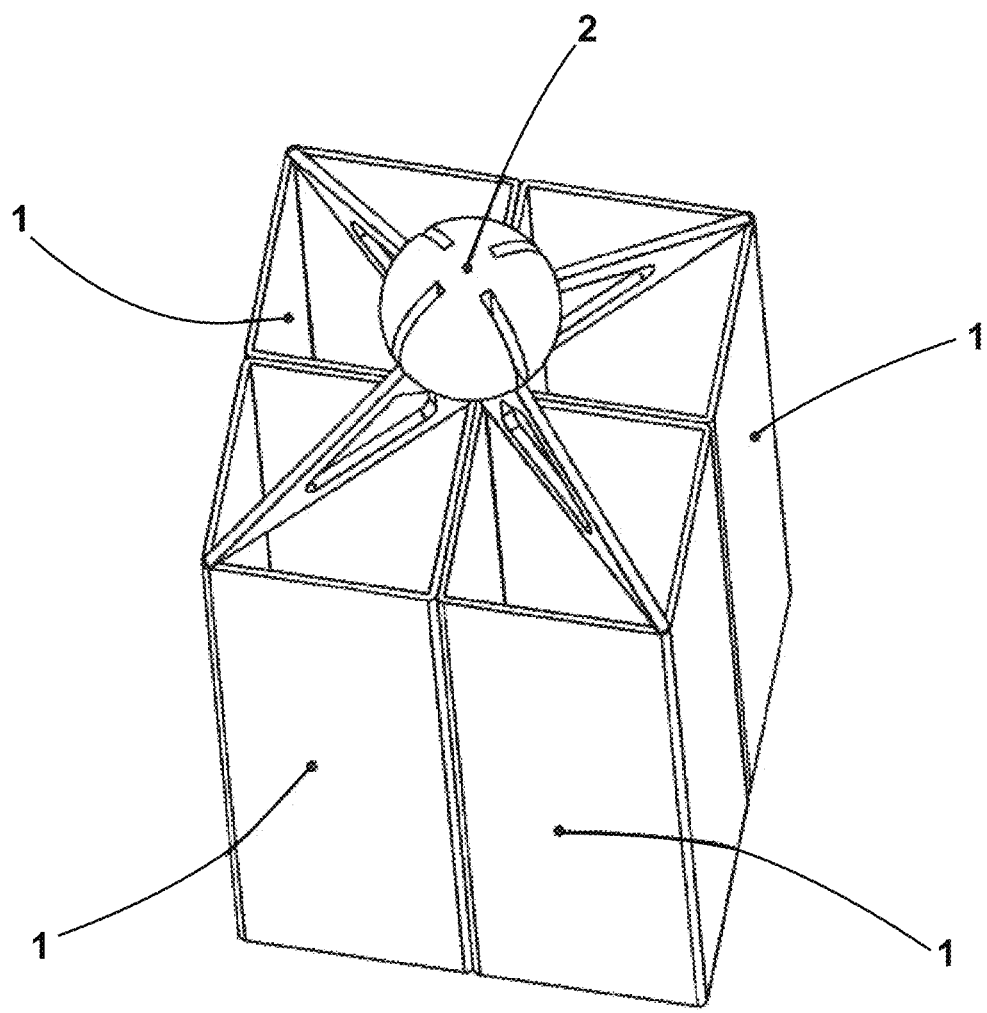
FIG. 16 depicts an implementation of a flowering articulation in a quadruple rectangular unit structure, shown in fully stowed state.

FIG. 16 depicts an implementation of a flowering articulation in a quadruple rectangular unit structure, having rectangular units (1) and rotational deployment unit (2), said flowering articulation in a quadruple rectangular unit structure being shown in fully stowed state. This design allows for infinite angles of relative deployments in relation to each individual structural unit and chassis re-configuration to take place during satellite's mission life.

Figure 17:
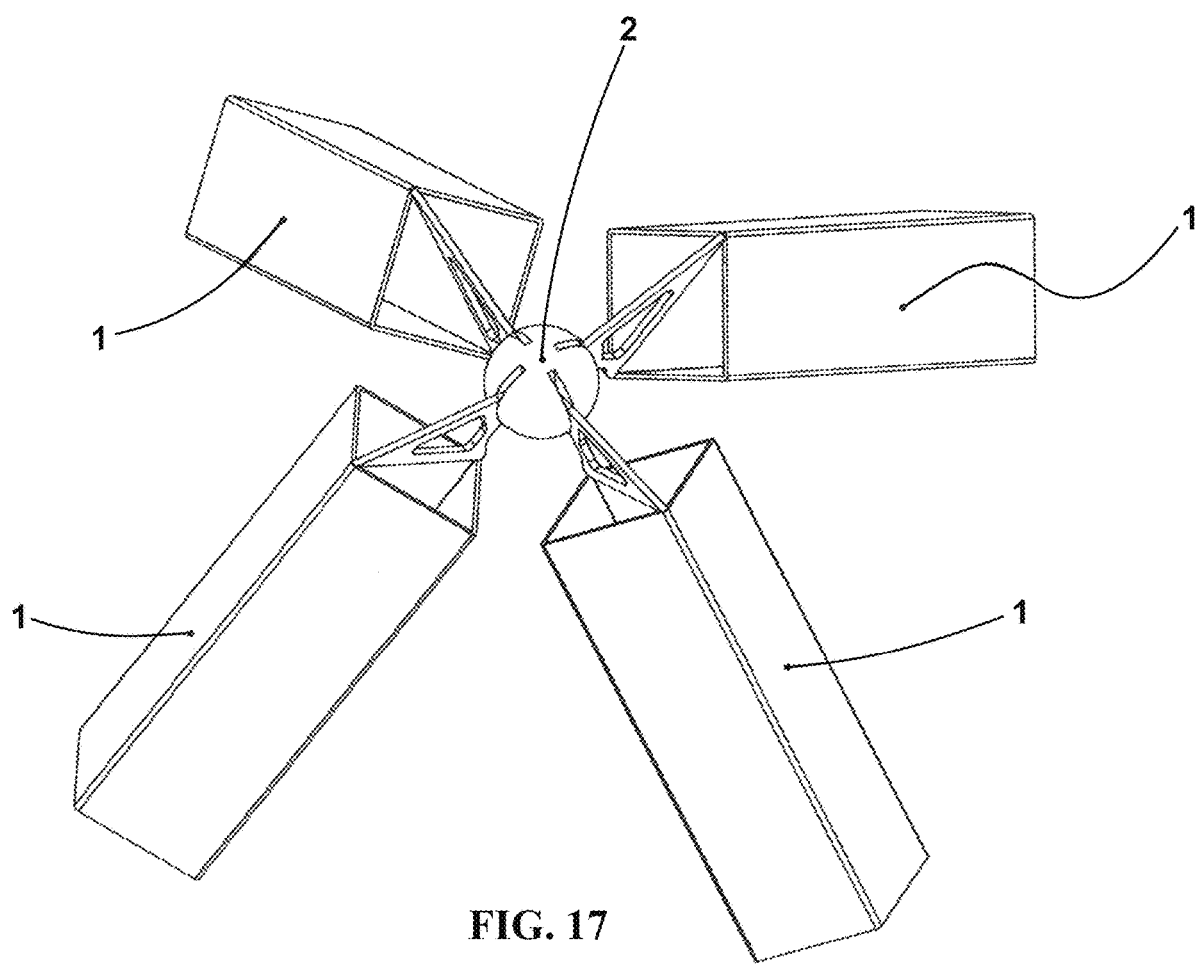
FIG. 17 depicts an implementation of a flowering articulation in a quadruple rectangular unit structure, shown in transit approaching a deployed state.

FIG. 17 depicts an implementation of a flowering articulation in a quadruple rectangular unit structure, having rectangular units (1) and rotational deployment unit (2), said flowering articulation in a quadruple rectangular unit structure being shown in transit approaching a deployed state. This design allows for infinite angles of relative deployments in relation to each individual structural unit and chassis re-configuration to take place during satellite's mission life.

Figure 18:
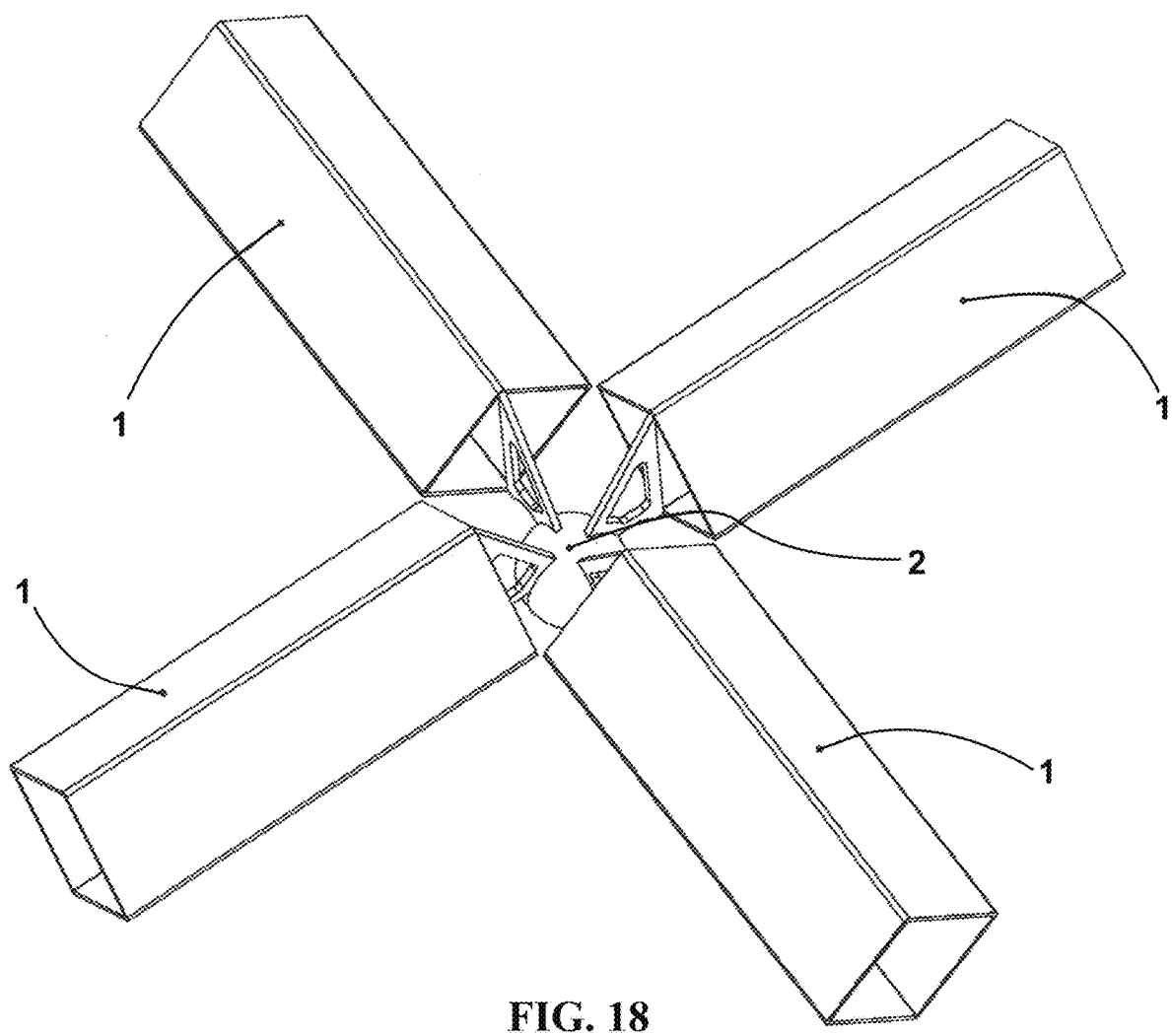
FIG. 18 depicts an implementation of a flowering articulation in a quadruple rectangular unit structure, shown in a typical deployed state.

FIG. 18 depicts an implementation of a flowering articulation in a quadruple rectangular unit structure, having rectangular units (1) and rotational deployment unit (2), said flowering articulation in a quadruple rectangular unit structure being shown in a typical deployed state. This design allows for infinite angles of relative deployments in relation to each individual structural unit and chassis re-configuration to take place during satellite's mission life.

Figure 19:
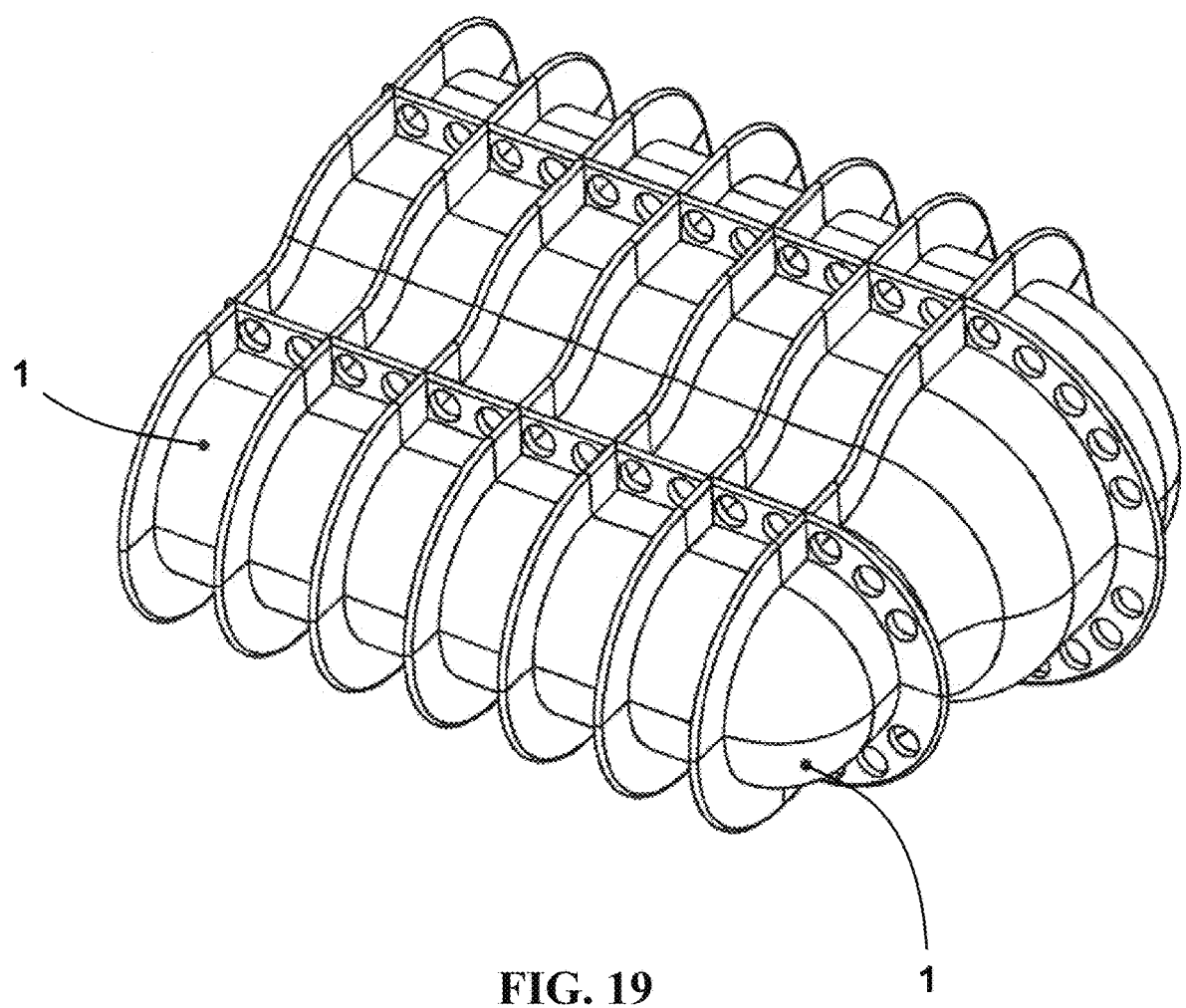
FIG. 19 depicts an implementation of a folding articulation in an organic-shaped unit structure, shown in a fully stowed state.

FIG. 19 depicts an implementation of a folding articulation in an organic-shaped unit structure, having organic-shaped unit structures (1), said folding articulation in an organic-shaped unit structure being shown in a fully stowed state.

Figure 20:
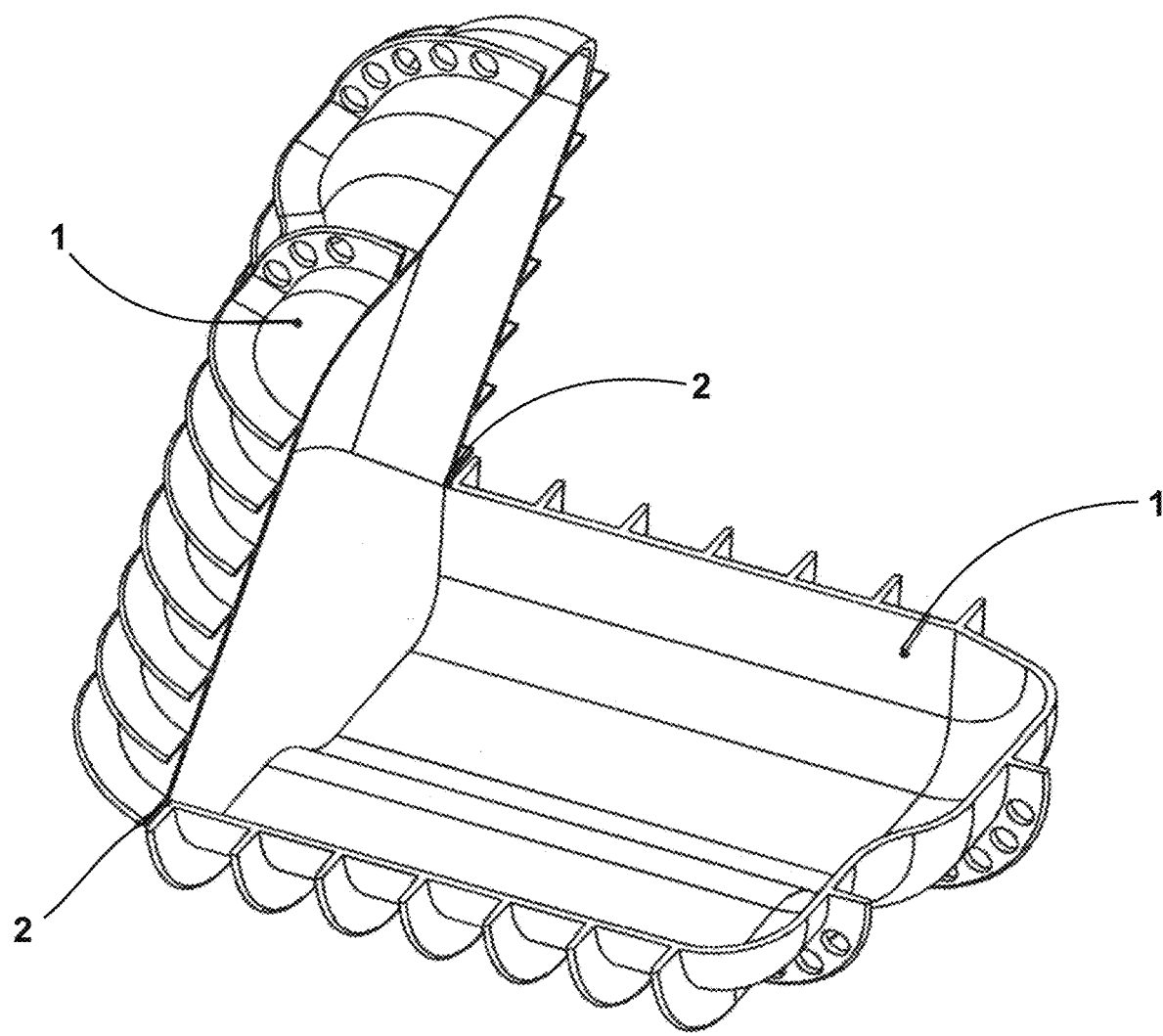
FIG. 20 depicts an implementation of a folding articulation in an organic-shaped unit structure, shown in transit approaching a deployed state.

FIG. 20 depicts an implementation of a folding articulation in an organic-shaped unit structure, having organic-shaped unit structures (1) and hinge locations (2), said folding articulation in an organic-shaped unit structure being shown in transit approaching a deployed state.

Figure 21:
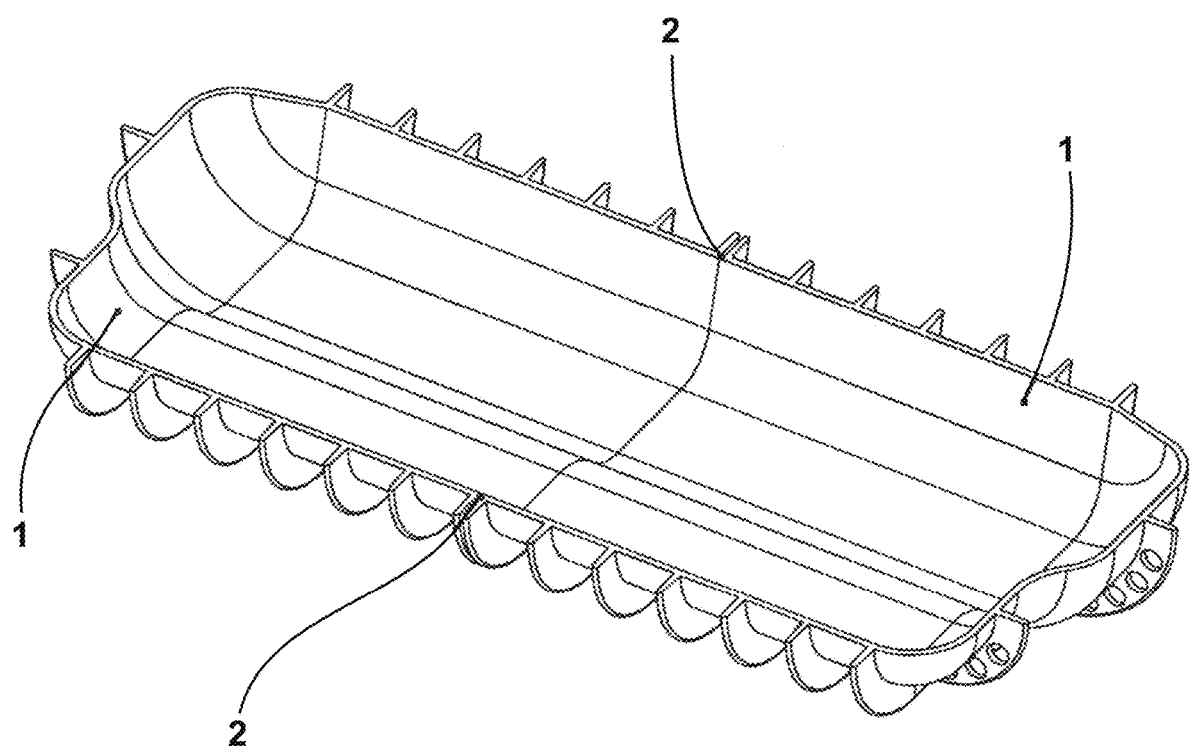
FIG. 21 depicts an implementation of a folding articulation in an organic-shaped unit structure, shown in a fully deployed state.

FIG. 21 depicts an implementation of a folding articulation in an organic-shaped unit structure, having organic-shaped unit structures (1) and hinge locations (2), said folding articulation in an organic-shaped unit structure being shown in a fully deployed state.

Figure 22:
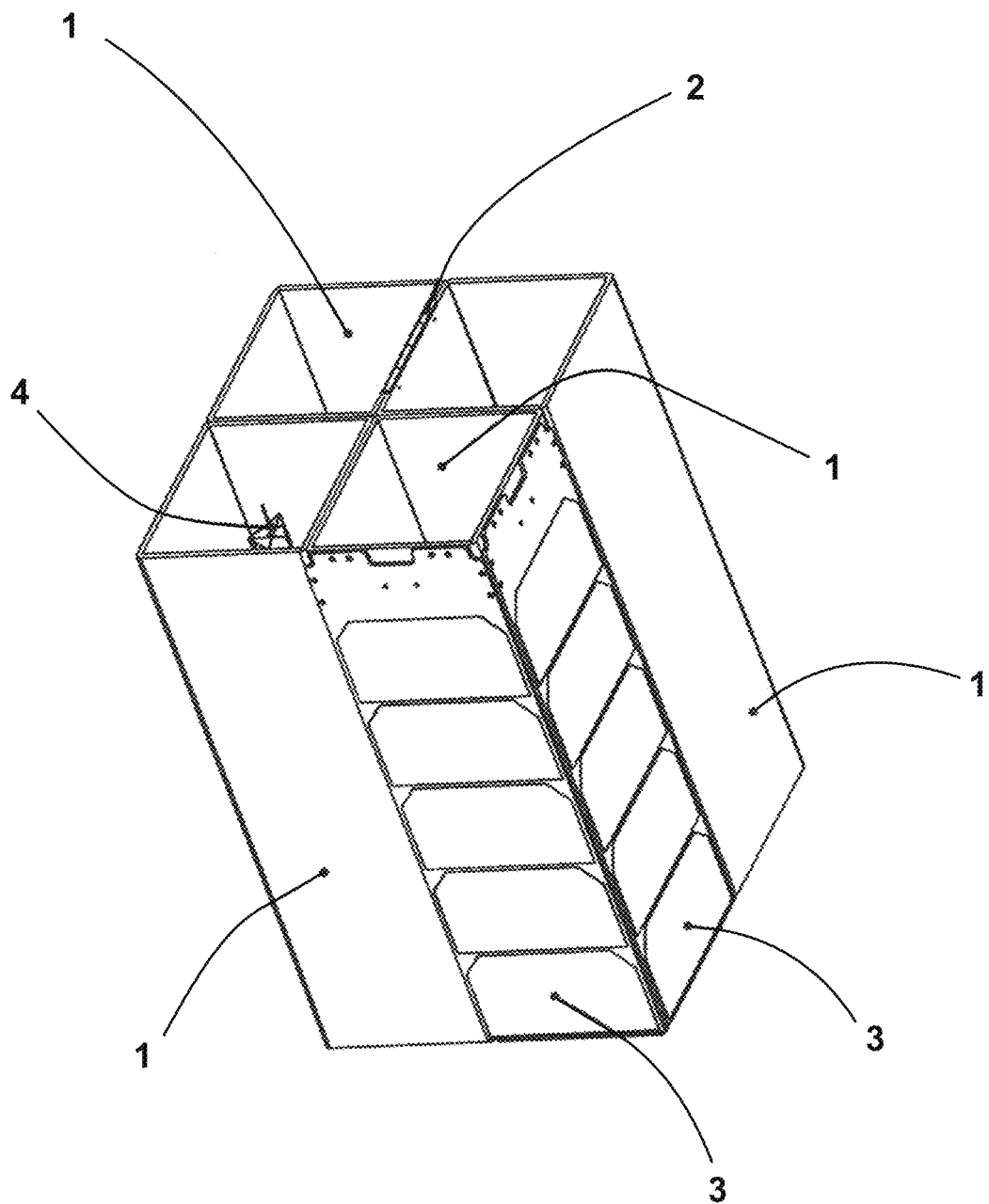
FIG. 22 depicts an implementation of a folding articulation in a quadruple unit structure with deployables, shown stowed.

FIG. 22 depicts an implementation of a folding articulating satellite in a quadruple unit structure with deployables, having structural units (1), connective hinges (2), external deployable solar panels (3) and internal deployable radio antenna (4), said folding articulating satellite being shown stowed.

Figure 23:
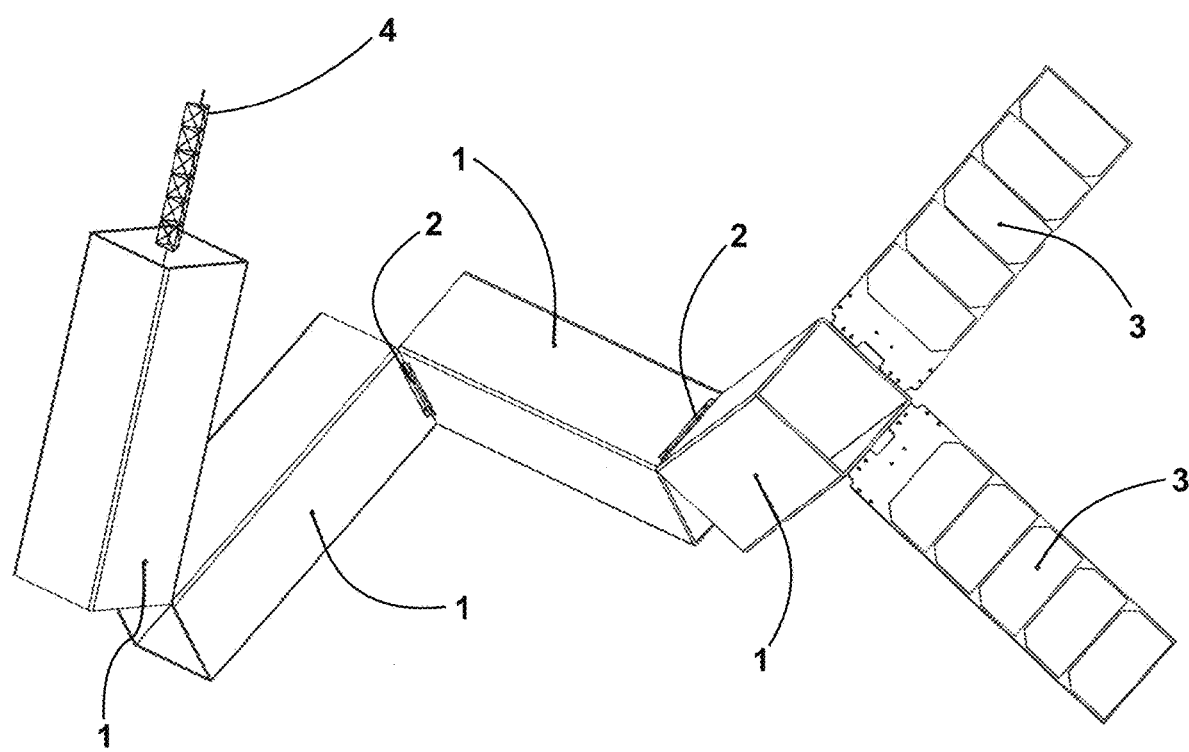
FIG. 23 depicts an implementation of a folding articulating satellite in a quadruple unit structure with deployables, shown in transit approaching a deployed state.

FIG. 23 depicts an implementation of a folding articulating satellite in a quadruple unit structure with deployables, having structural units (1), connective hinges (2), external deployable solar panels (3) and internal deployable radio antenna (4), said folding articulating satellite being shown in transit approaching a deployed state.

Figure 24:
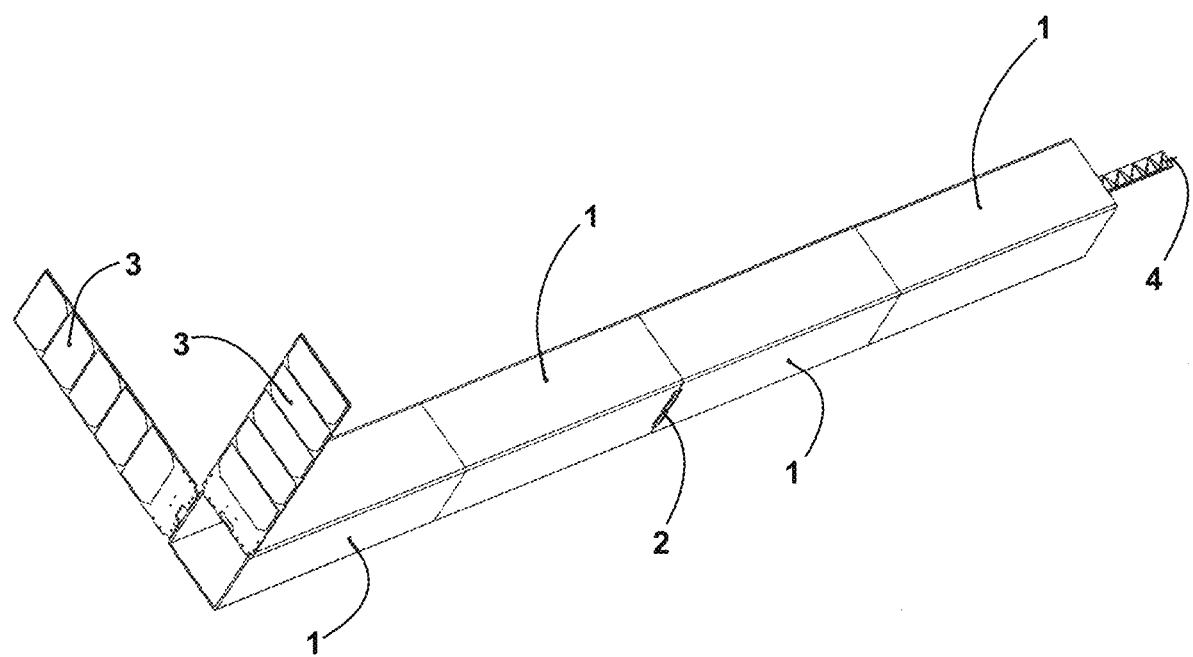
FIG. 24 depicts an implementation of a folding articulation in a quadruple unit structure with deployables, shown in a fully deployed state.

FIG. 24 depicts an implementation of a folding articulating satellite in a quadruple unit structure with deployables, having structural units (1), connective hinges (2), external deployable solar panels (3) and internal deployable radio antenna (4), said folding articulating satellite being shown in a fully deployed state.

Articulating Spacecraft Chassis and Articles Comprising Same

Applicants disclose an articulating spacecraft chassis comprising:
a) at least two articulation units, said articulation units having an interior volume;
b) at least one rotational and/or translational unit;
c) one or more self-locking units; and
d) at least one power source affixed to, contained in or deployable from said articulating spacecraft chassis, said at least one power source being a battery, a solar power source, and/or a radioisotope electric generator;
said at least two articulation units and being connected via said at least one rotational and/or translational unit, said one or more self-locking units being positioned on said at least two articulation units and/or on said at least one rotational and/or translational units, said one or more self-locking units locking said at least two articulation units in a deployed position when said articulating spacecraft chassis is deployed in space.

Applicants disclose an articulating spacecraft chassis according to the previous paragraph wherein said interior volume of said at least two articulation units contains an electrical power system, an attitude control system, a communication system, a payload and experiment system and/or navigation system.

Applicants disclose an articulating spacecraft chassis according to the previous two paragraphs, said articulating spacecraft chassis comprising at least one interior or exterior deployable, said at least one interior or exterior deployable being affixed to said articulating spacecraft chassis in at least one spot on said articulating spacecraft chassis, preferably each said interior or exterior deployable is a solar panel, an antenna, an optical boom or a robotic arm. Applicants are clear that for purposes of this specification an interior or exterior deployable is not an articulation unit as an interior or exterior deployable is not part of a spacecraft chassis but is instead, an appendage that is affixed to a spacecraft chassis.

Applicants disclose an articulating spacecraft chassis according to the previous three paragraphs wherein, each said articulation units having independently an organic, asymmetrical and/or symmetrical geometry.

Applicants disclose an articulating spacecraft chassis according to the previous four paragraphs wherein said symmetrical or asymmetrical is selected from quadrilateral, triangular geometries and closed conic sections, preferably said symmetrical or asymmetrical geometries are selected from triangles, circles, squares, rectangles, cylinders, hexagons, parallelograms, pentagons, octagons, heptagons, rhombus, trapeziums, ovals, decagons, more preferably said symmetrical or asymmetrical geometry is selected from triangles, squares, and rectangles.

Applicants disclose an articulating spacecraft chassis according to the five previous paragraphs wherein, each rotational and/or translational unit is independently selected from the group consisting of a geneva stop, a cam, a chain and sprocket, a parallel link, a universal joint, a piston, a gimbal, a rack and pinion, a scissor mechanism, a electro-server, a shape memory alloy, a worm gear, a pulley/cable, a linear bearing and rail, a torsion spring, and a hinge; preferably each rotational and/or translational unit is independently selected from the group consisting of a parallel link, a universal joint, a piston, a gimbal, a rack and pinion, a scissor mechanism, a electro-server, a shape memory alloy, a worm gear, a pulley/cable, a linear bearing and rail, a torsion spring, and a hinge, more preferably each rotational and/or translational unit is independently selected from the group consisting of a rack and pinion, a scissor mechanism, a electro-server, a shape memory alloy, a worm gear, a pulley/cable, a linear bearing and rail, a torsion spring, and a hinge, most preferably each rotational and/or translational unit is independently selected from the group consisting of a linear bearing and rail, a torsion spring, and a hinge. Here, by way of nonlimiting example, the rack and pinion, scissor mechanism, parallel link, linear bearing and rail can a translational capability to the articulating spacecraft chassis, the universal joint, electro-server, torsion spring, geneva stop, shape memory alloy, gimbal, hinge can provide a rotational capability to the articulating spacecraft chassis and the worm gear, cam, piston, pulley and cable, and the chain and sprocket can provide translational and rotational capabilities to the articulating spacecraft chassis.

Applicants disclose an articulating spacecraft chassis according to the previous six paragraphs wherein, each articulation unit independently has an Euclidian geometry or a non-symmetrical geometry, preferably each said Euclidian geometry is independently hemispherical, segmented hemispherical, rectangular prismatic, cubic, bisected cylindrical, segmented cylindrical, tetrahedral, or pyramidal articulation is a passive articulation unit, more preferably each said Euclidian geometry is rectangular prismatic, cubic, bisected cylindrical or segmented cylindrical, most preferably rectangular prismatic or cubic.

Applicants disclose an articulating spacecraft chassis according to the previous seven paragraphs wherein said locking units each locking unit independently is an active locking unit or a passive locking unit, preferably each locking unit is a passive locking unit, preferably each passive locking unit is independently a permanent magnet, a spring assisted latch or torsion spring; preferably each active locking unit is independently an electro-servo, an electro-mechanical latch or an electro magnet, more preferably each active locking unit is an electro-servo. A passive locking is generally self-activating and an active locking unit is not self-activating.

Applicants disclose an articulating spacecraft chassis according to the previous eight paragraphs wherein:
  a) each said battery is independently a secondary battery or a primary battery<preferably each said battery is a secondary battery, preferably each said secondary battery independently comprises an alkaline, zinc chloride, zinc carbon, silver oxide, zinc air and/or a lithium anode; preferably each said primary battery independently comprises Ni—Cd, Nickel metal hydride and/or Lithium ion; most preferably each said secondary battery independently comprises an alkaline, zinc chloride, zinc carbon, silver oxide, zinc air or a lithium anode; and each said primary battery independently comprises Ni—Cd, Nickel metal hydride or Lithium ion;
  b) each solar power sources is independently a deployable solar power source or a solar power source fixed to said articulating spacecraft chassis, preferably each solar power sources is a deployable solar power; and
  c) each radioisotope electric generator independently comprises Cobalt-60, Nickel-63, Krypton-85, Strontium-90, Ruthenium-108, Cesium-137, Cerium-144, Promethium-147, Americium-241, Curium-242, Curium-244, Tritium-3, Polonium-210, or Plutonium-238, preferably each radioisotope electric generator independently comprises Tritium-3, Polonium-210, or Plutonium-238.

Applicants disclose a spacecraft delivery vehicle comprising a dispenser said dispenser containing an articulating spacecraft chassis of according to any of the previous nine paragraphs, preferably said spacecraft delivery vehicle comprises a rocket engine.

Process of Making an Articulating Spacecraft Chassis

The articulating spacecraft chassis disclosed herein can be assembled by a skilled artisan by combing the requisite components disclosed herein as detailed, by way of example, in the examples and drawings.

Suitable materials for making the aforementioned articulating spacecraft chassis are non-outgassing material suitable for spacecraft structural purposes such as aluminum, stainless-steel, steel, brass, polyetherimide, polyether ether ketone, polyoxymethylene, reinforced carbon fibers, reinforced fiberglass, ceramic, glass, and any non-outgassing material suitable for spacecraft structural purposes.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

A team of engineers is designing a 6U CubeSat which will host a small telescope. The ground sampling distance which the team requires cannot be met with the current length of the telescope and the engineers are proposing the use of a larger CubeSat, specifically a 12U. While this would give more room, the launch cost associated with a 12U are significantly higher than a 6U and there would be empty, un-used space in the 12U which is not optimal. Instead, the team decides to use the 6U and equipped the system with the articulating spacecraft chassis design such that the 2U by 3U volume can re-orient itself into a 1U by 6U volume in space. This will decrease the width of the spacecraft but increase the length, allowing for the implementation of the telescope on a 6U platform, similar to the one seen in FIG. 1 and FIG. 3.

Example 2

A small satellite platform is being designed to host 10 instruments which will collect large amounts of data about the earth and the environment of low earth orbit. Due to the problem which the satellite platform is designed to solve, all 10 instruments must collect their required data. No satellite platform on the market will accommodate the configuration which the 10 instruments require. Instead, the engineers designing the satellite platform choose to articulate the instruments in space to their required configuration. To do this, a 3-dimensional model is made of where each instrument must sit when collecting data, then a combination of rotating and translating devices are used to compress the instruments into a stable launch configuration.

Example 3

A team of spacecraft designers are developing a 12U CubeSat for observation of harmful algae blooms in Lake Erie. The satellite will be placed into a circular orbit with an altitude of 300 km where atmospheric drag will decrease the lifetime of the mission, resulting in the spacecraft re-entering earth's atmosphere and burning up. The team wants to reduce this drag as much as possible and to do so, must decrease the cross sectional area that is exposed to the direction of travel. To do this, the team develops a 12U chassis which uses the articulating design such that after deployment, only 2U's are facing the in-track direction rather than 4U's. This in-orbit volume reconfiguration decreases the drag by a factor of 2, extending the lifetime of the mission.

Example 4

A 12U satellite is being developed for earth observation and does not have the ability to host thrusters or reaction wheels which normally provide stability and control. The team is planning on using magnetic torquers and gravity gradient torque for stabilization. Magnetic torquers generate magnetic fields with push and pull against the earth's magnetic fields for control. Gravity gradient torque uses the difference in gravity between the bottom and top of the spacecraft for stabilization. The team finds that they will be unstable unless they can increase their control forces. To accentuate the effect of the gravity gradient torque, the team designs the 12U satellite open up into a rod-like configuration, going from a 3U by 4U to a 1U by 12U. This will increase the gravity gradient torque and allow the satellite to be launched without reaction wheels or thrusters.

A team cannot fit all of the desired sensors onto a satellite in the desired orientation due to the static orientation of the satellite. The team designs a satellite chassis which can fit into a commercial off the shelf launch canister but can re-orient itself in space. The first step in designing a dynamic spacecraft platform is to select a commercial off the shelf ejection canister. The requirements of this canister will drive the initial volume requirements. A custom canister can be made for the spacecraft but may not be needed if the satellite development process is done well. Once an ejection canister is selected, the form factor of the ejection canister set the requirements for the initial orientation of the satellite chassis. This orientation is the pre-launch, pre-ejection orientation. The requirements of this orientation are often driven by length, width, height, center of mass, clamp/rail locations, total mass, etc. These requirements can also be influenced by the launch provider. Once the launch/ejection requirements are known, a design can be made in CAD software like Solidworks® or AutoCAD®. In this process, the required volume can be divided into sections which can rotate/translate after ejection from the canister has occurred. These sections are designed to withstand the harsh launch and space environment. For the launch environment, the dynamic spacecraft platform can be designed with pins and tabs as seen in FIG. 6 which can dampen the vibrational loads of the launch process. This method can be iterative, and vibration testing should be simulated in the above listed CAD software before physical vibration testing is performed. During the CAD process, the 3-axis of vibrational stresses should be considered. When considering these vibrational loads tabs should be designed to dampen loads along multiple axis while ensuring deployment after being subjected to launch conditions. An example of this can be seen in FIG. 6 where the tab is designed to dampen vibration but are tapered/angled to prevent latch ups and deployment failures. Other methods of vibrational dampening can involve floating hinge pins, loose tolerances to allow for less contact between stress points, and passive vibrational dampeners. Once pins and tabs are placed on the dynamic spacecraft platform, a material for the satellite chassis must be selected. A material which can withstand both launch and space conditions is required. The current capable materials include aluminum, stainless steel, brass, Inconel, and non-metallic polymers such as polybutadiene, polychloroprene, and polyurethane, which have been used in previous satellite chassis and have shown to perform well under both previous stated environments/conditions. After the proper material is selected for the dynamic spacecraft platform, the mass of each "module" is known. The force presented by the rotation/translational devices can now be selected to control the speed of actuation after launch/canister ejection. Due to the large amount of rotational/translational devices, there are many methods of varying the force applied in the process of deployment. The most common method of force tuning is with spring selection and spring tension setting. If more advanced methods of rotation/translation are used, specifically those under electrical control, the speed of those actuations can be coded and controlled by the developer. The next step is to manufacture and assemble the spacecraft chassis with all rotational and translational components. Once assembled, the chassis should be placed inside a test ejection canister which acts as a copy of the selected ejection canister. Once the dynamic spacecraft chassis is folded and inside the canister, the canister is secured to a vibration testing table which can simulate the launch conditions of a rocket. The canister is then tested along the 3 fundamental axis. If the vibration testing is successful, the dynamic spacecraft chassis is removed from the canister, cleaned, and additional space qualified parts are assembled into the chassis, such that the chassis is ready for launch. The chassis can be vibration tested again with the included parts. Once it has passed a second vibration test, the chassis can be launched into orbit where the pre-set satellite chassis re-orientation occurs.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An articulating spacecraft chassis having a stowed state and a deployed state, said articulating spacecraft chassis comprising:
   a) at least two articulation units comprising a first articulation unit and a second articulation unit, said articulation units each having four sides, a first end, and a second end, wherein said first and second ends are square and each of said first and second end of said articulation units has four edges, wherein:
      said articulation units are comprised of a plurality of structural members that are joined together, wherein said structural members form a frame structure on each of said four sides, wherein each frame structure has a plurality of openings therein, wherein said structural members surround said openings, and said articulation units have an interior volume;
      wherein the sides of said articulation units are rectangular and have a length that is longer than the edges of the square first and second ends of said articulation units, wherein said articulation units have a rectangular cuboid configuration in which the lengths of the sides are a multiple of the length of the edges of the square first and second ends, wherein said multiple is 3, and said articulating spacecraft chassis comprises a 6U CubeSat that re-orients itself into a 1U by 6U volume in its deployed state;
   b) at least one rotational unit, wherein said at least one rotational unit connects a pair of said at least two articulation units at one of their first and second ends to permit rotation of said articulation units in said pair relative to each other, wherein the first and second articulation units are arranged end-to-end when said articulating spacecraft chassis is in its deployed state to form an elongated tubular structure with a square cross-section wherein ends of said articulation units are adjacent to one another, and the ends of said articulation units that are adjacent to one another have a central region, and the ends of said articulation units that are adjacent to one another have an enlarged opening in said central region so that when the articulating spacecraft chassis is in the deployed state, it is configured to contain an object, or portions thereof, in the interior volume of both of said first and second articulation units;
   c) one or more locking units positioned on said at least two articulation units and/or on said at least one rotational unit, wherein said one or more locking units lock said at least two articulation units in a deployed state when said articulating spacecraft chassis is deployed in space; and
   d) at least one power source affixed to, contained in or deployable from said articulating spacecraft chassis, said at least one power source comprising a battery, a solar power source, and/or a radioisotope electric generator.

2. An articulating spacecraft chassis having a stowed state and a deployed state, said articulating spacecraft chassis comprising:
   a) at least two articulation units, said articulation units each having four sides, a first end, and a second end, wherein said first and second ends are square and each of said first and second end of said articulation units has four edges, wherein the sides of said articulation units are rectangular and have a length that is longer than the edges of the square first and second ends of said articulation units, wherein:
      said articulation units are comprised of a plurality of structural members that are joined together, wherein said structural members form a frame structure on each of said four sides, wherein each frame structure has a plurality of openings therein, wherein said structural members surround said openings;
      the first end of at least one of said articulation units comprises an end plate, wherein the end plate has two opposing faces, sides, and a plurality of side surfaces, and said articulation units have an interior volume;
   b) at least one rotational unit, wherein said at least one rotational unit connects a pair of said at least two articulation units to permit rotation of said articulation units in said pair relative to each other, wherein said at least one rotational unit connects the pair of articulation units at one of their first and second ends;
   c) one or more locking units positioned on said at least two articulation units and/or on said at least one rotational unit, wherein said one or more locking units lock said at least two articulation units in a deployed state when said articulating spacecraft chassis is deployed in space, wherein the locking units comprise a plurality of magnets joined to the end plate of at least one of said articulation units, and said magnets are positioned adjacent to the sides of said end plate, and the magnets are inserted into compartments in said end plate via slits in one or more of the side surfaces of said end plate, and said end plate has openings therein on each face of the same to expose the magnets in said compartments; and
   d) at least one power source affixed to, contained in, or deployable from said articulating spacecraft chassis, said at least one power source comprising a battery, a solar power source, and/or a radioisotope electric generator.

* * * * *